Nov. 26, 1963 R. A. ENGLANDER ETAL 3,111,797
ARTICLE CARRIER, METHOD AND APPARATUS
FOR ERECTING SAME
Filed July 2, 1962 15 Sheets-Sheet 1
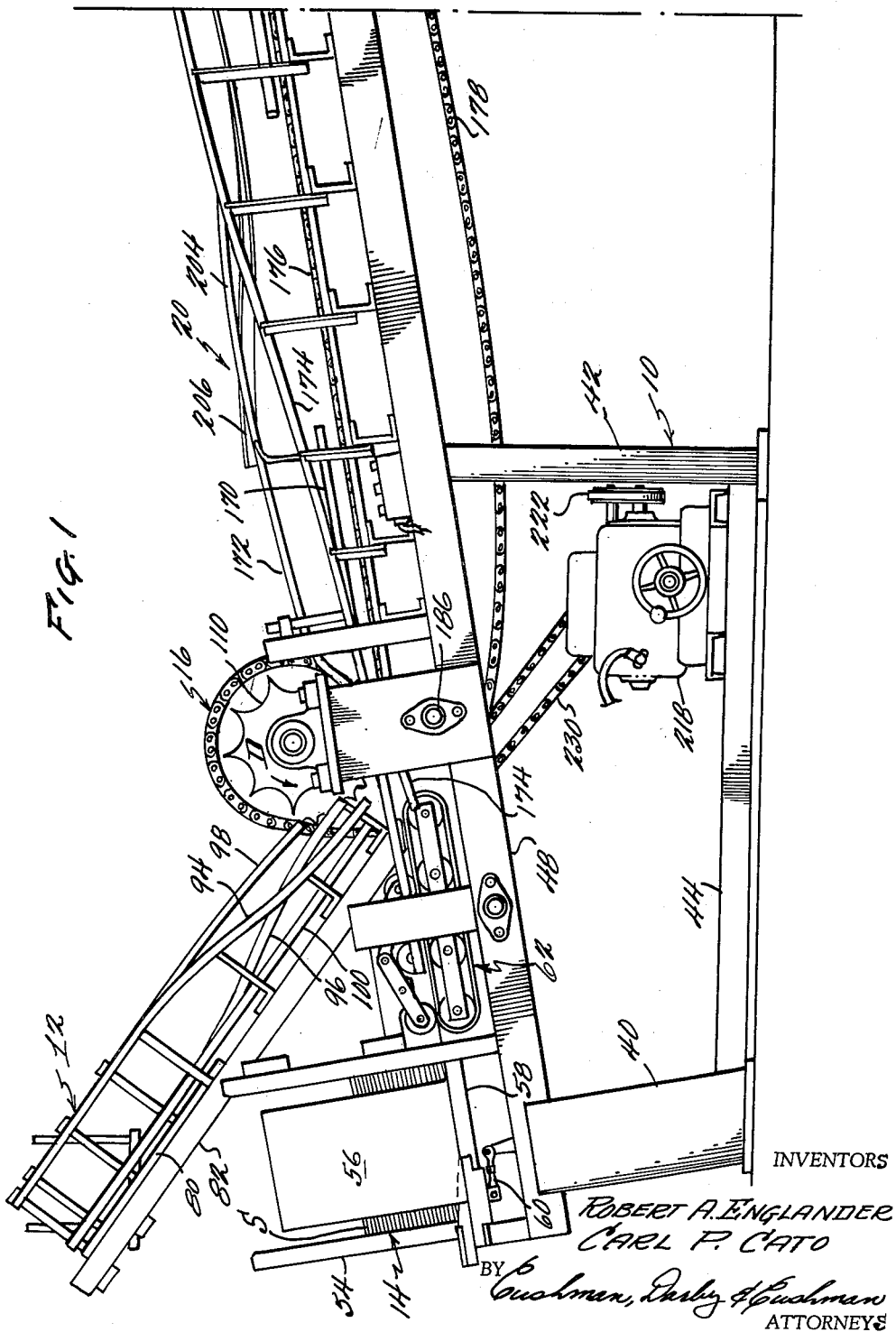
INVENTORS
ROBERT A. ENGLANDER
CARL P. CATO
BY Cushman, Darby & Cushman
ATTORNEYS

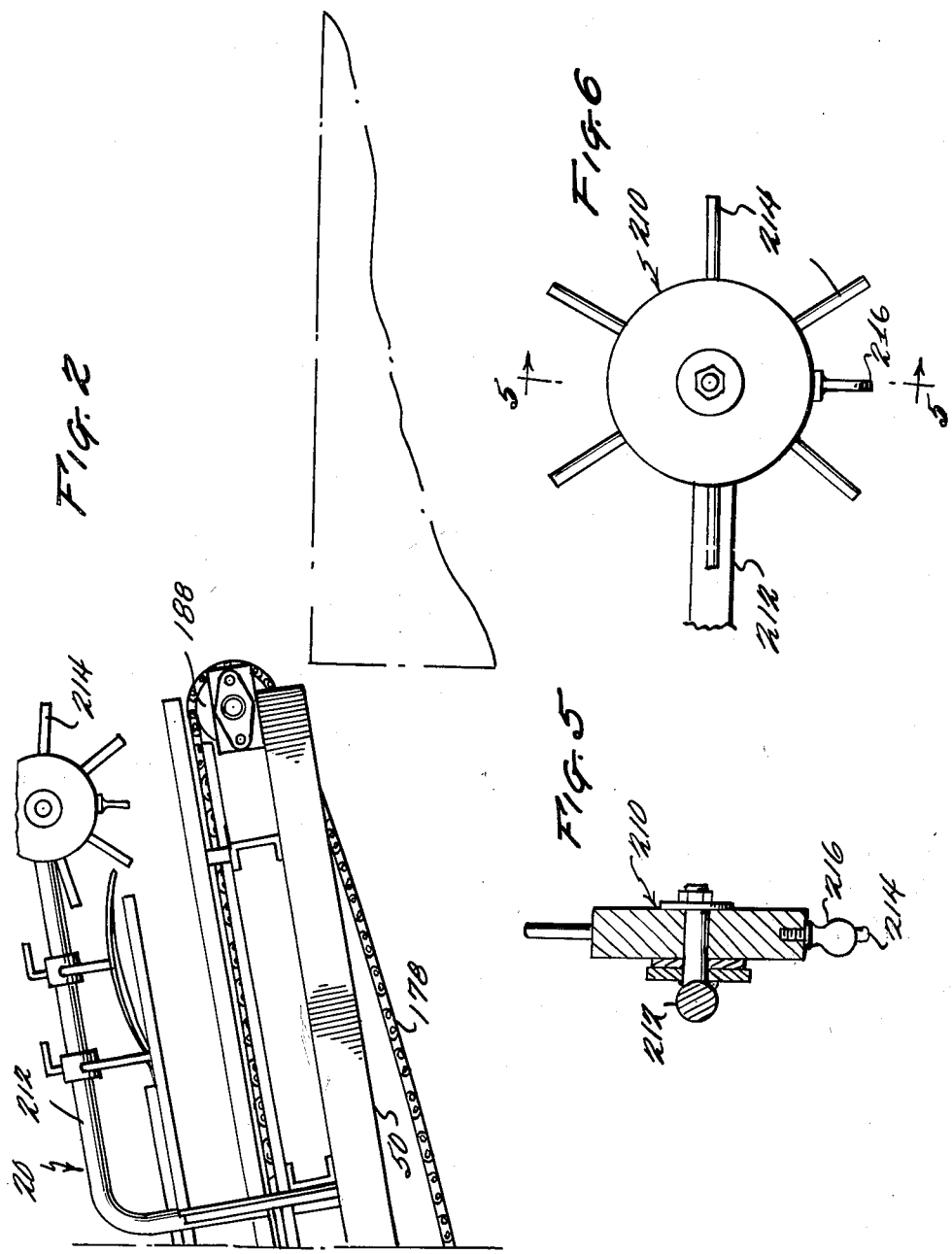

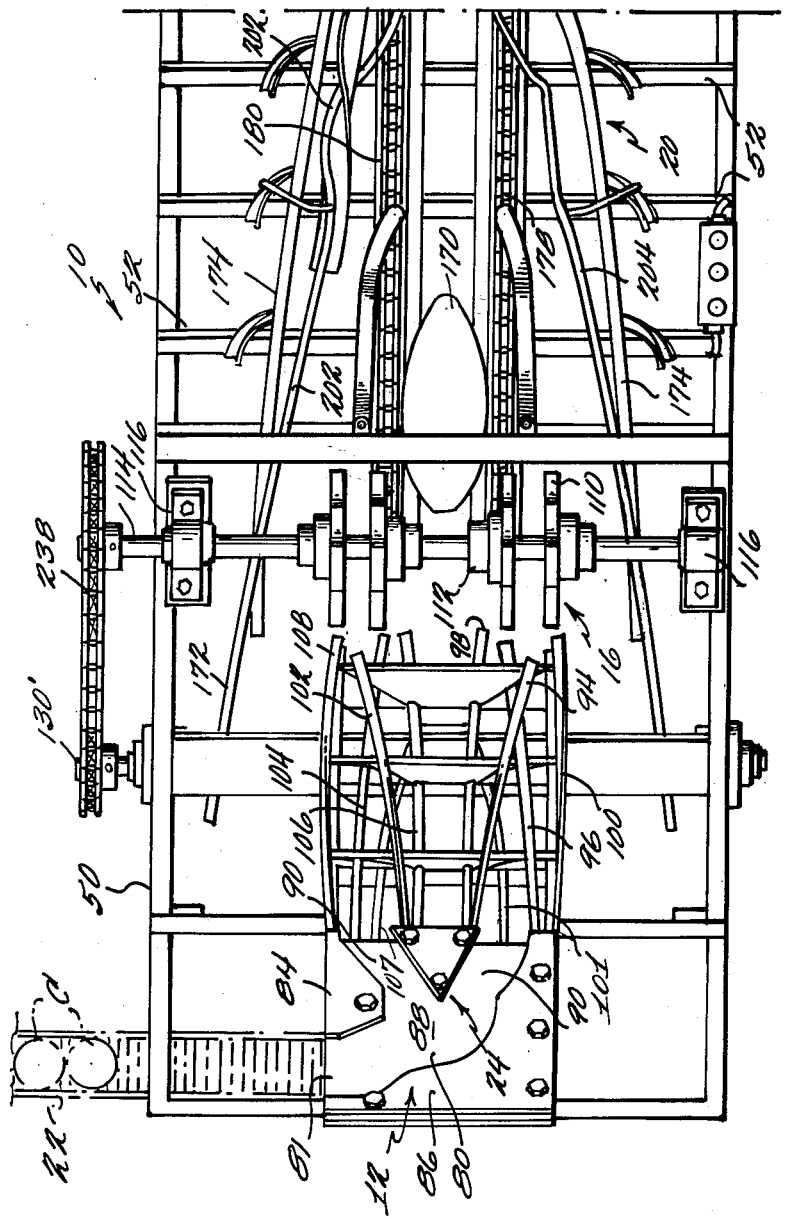

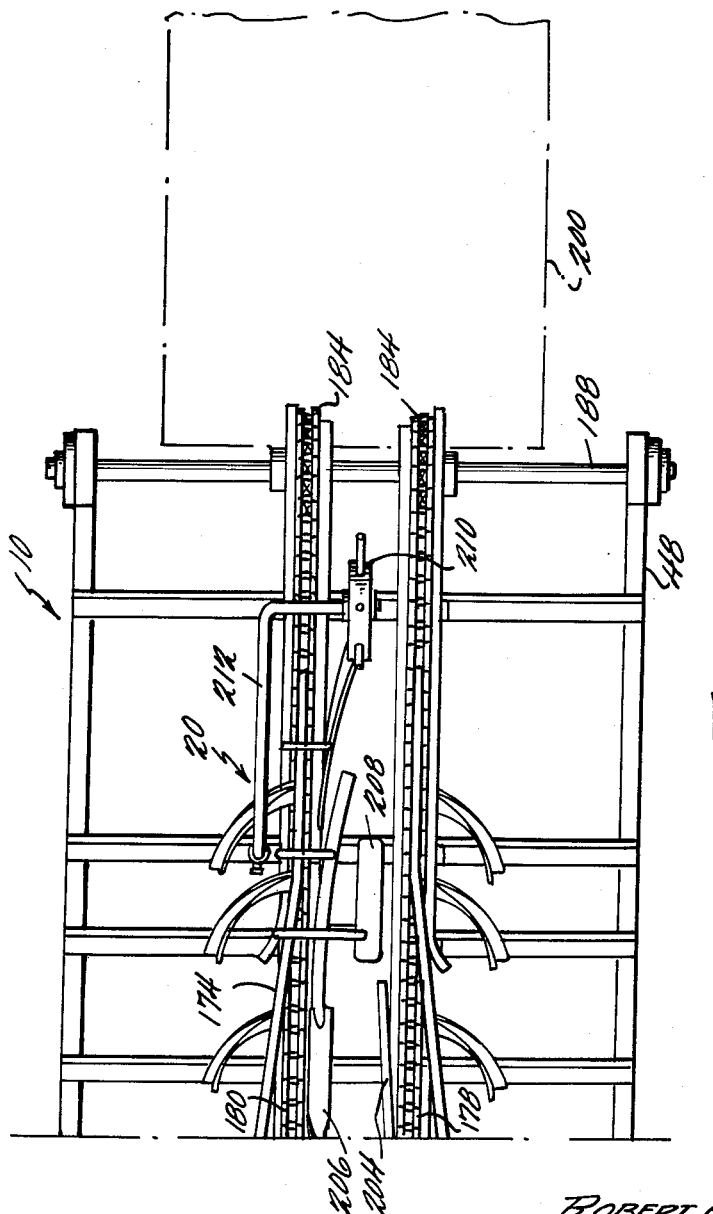

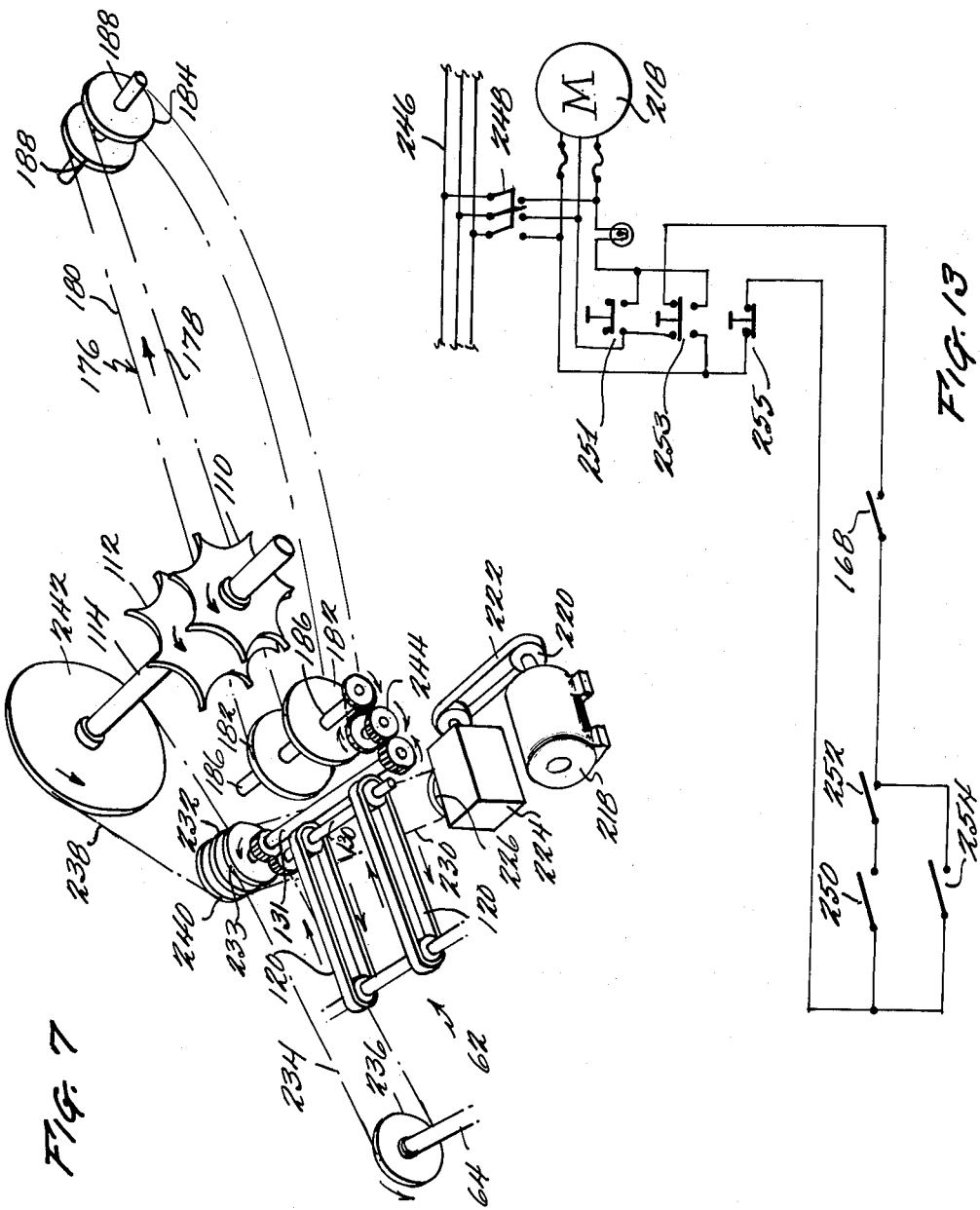

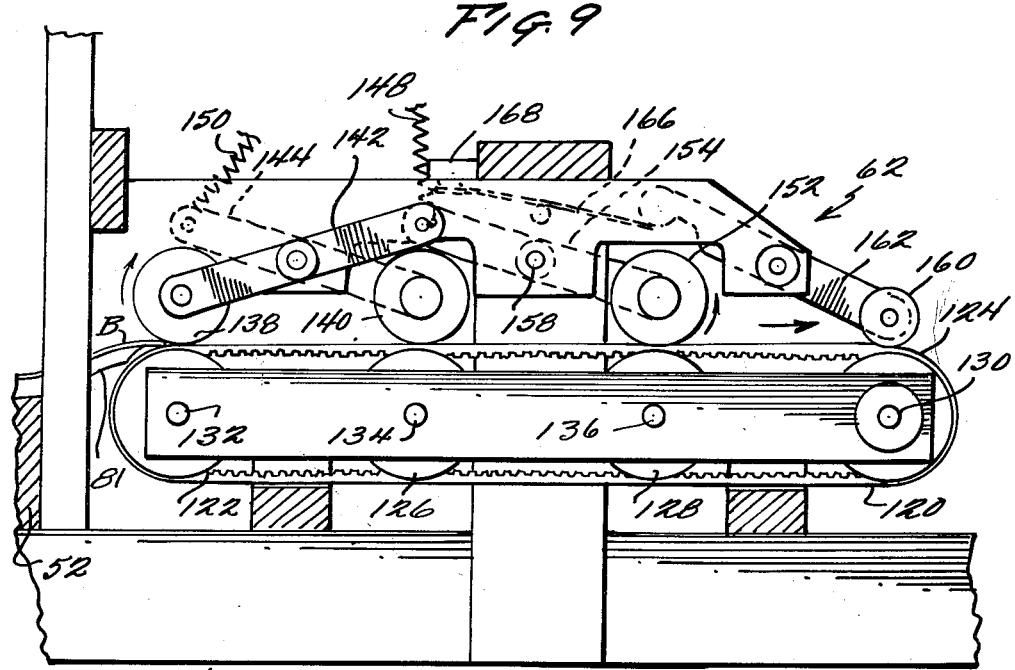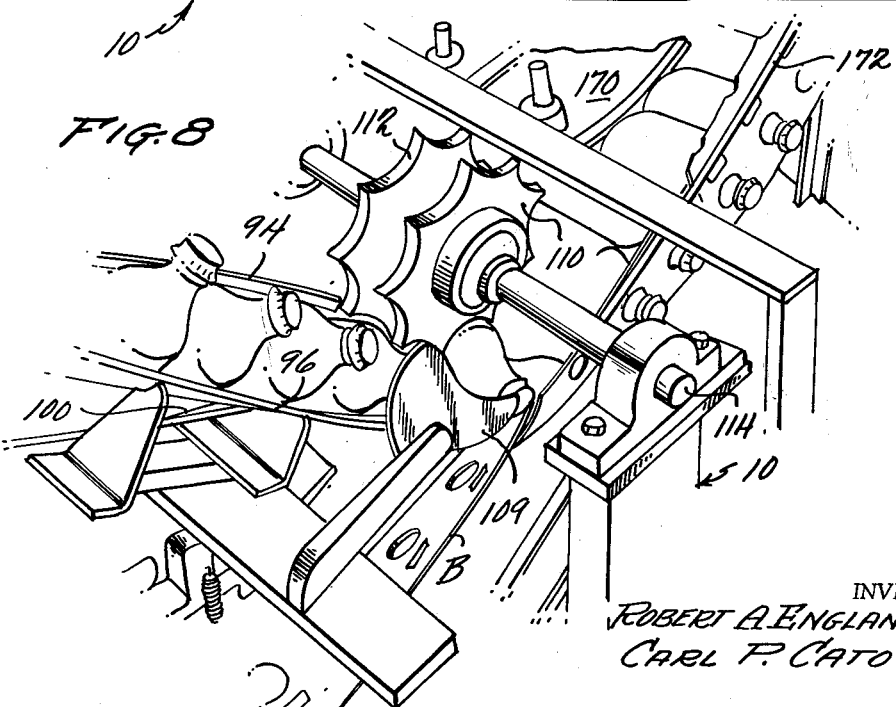

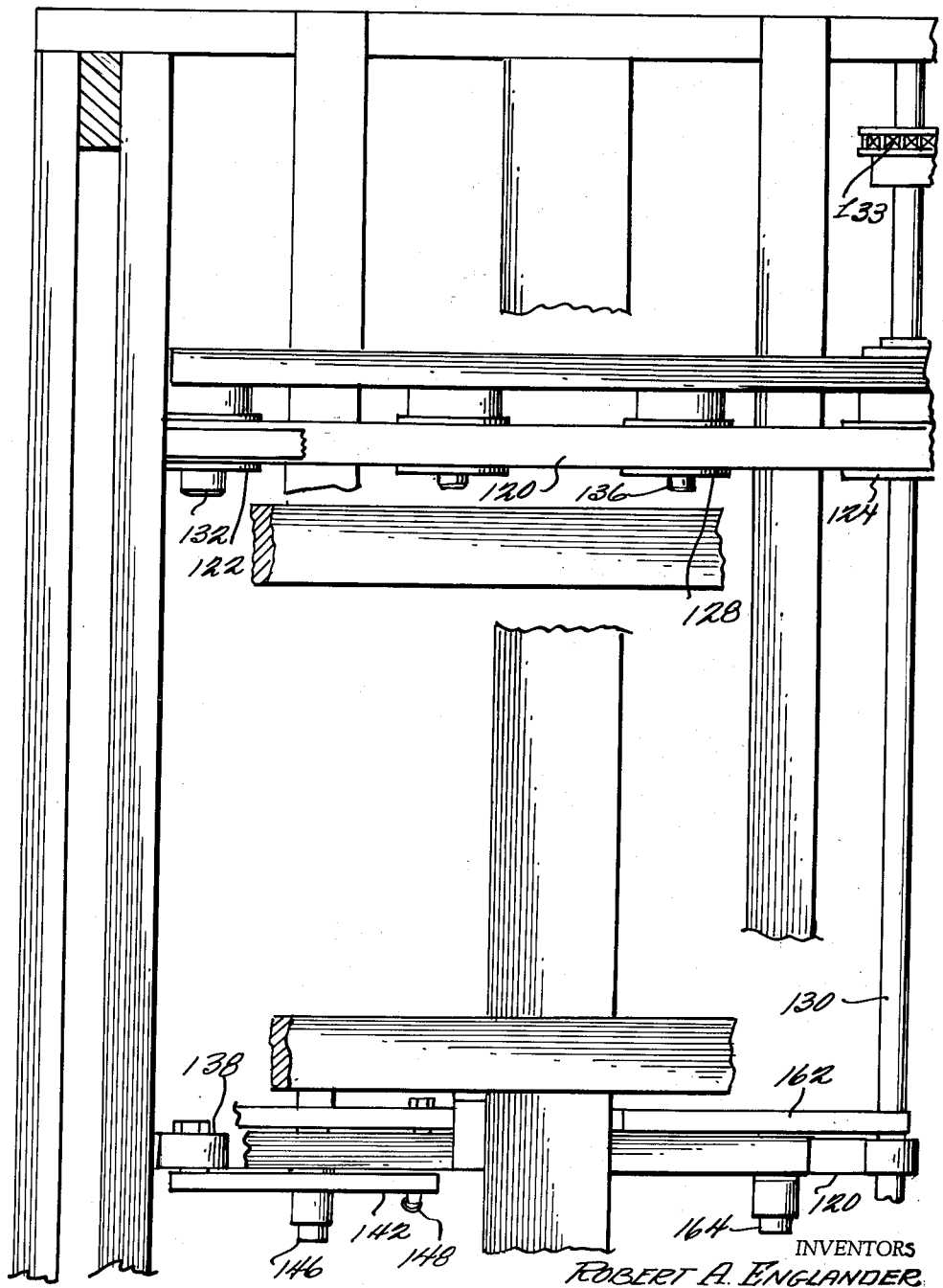

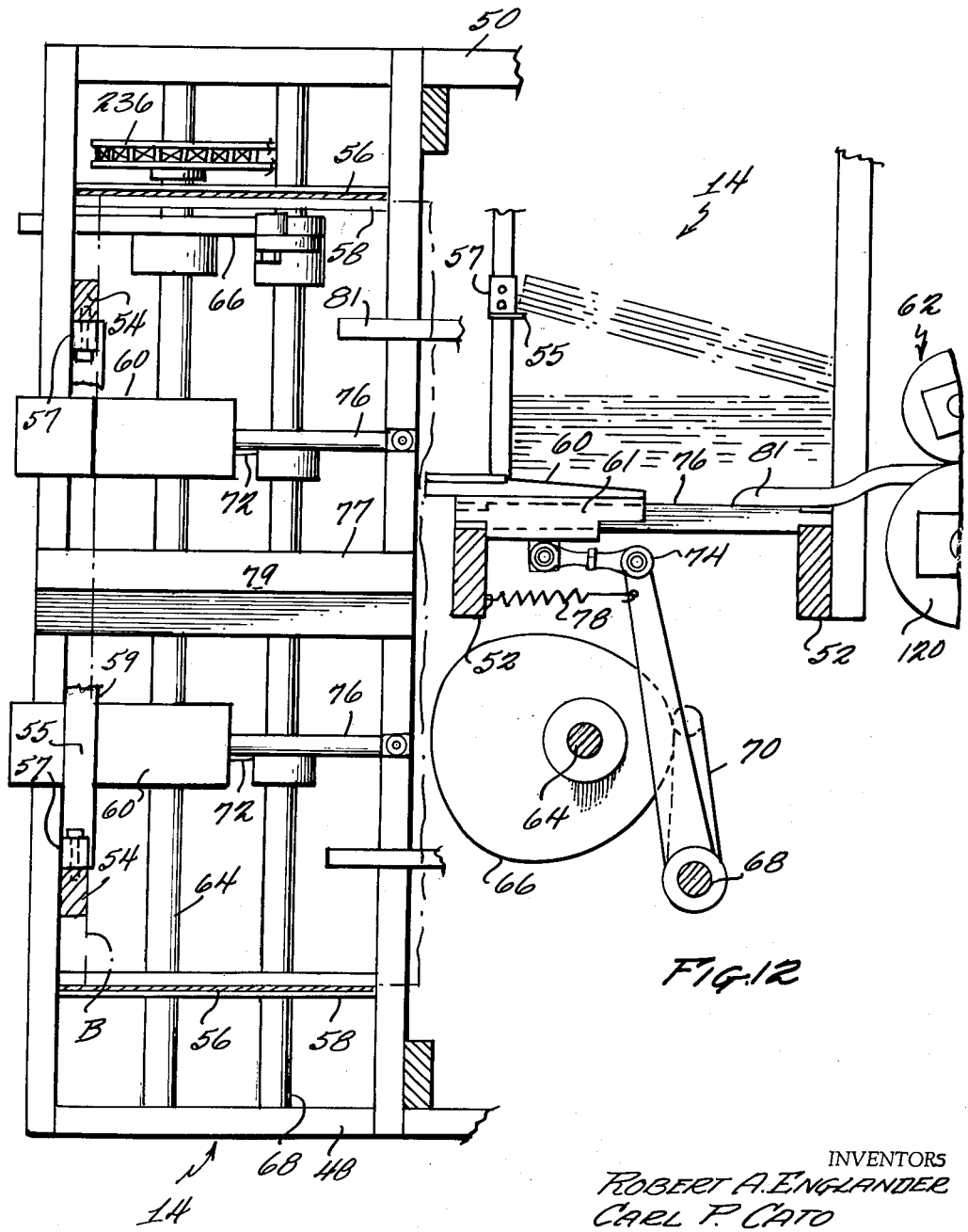

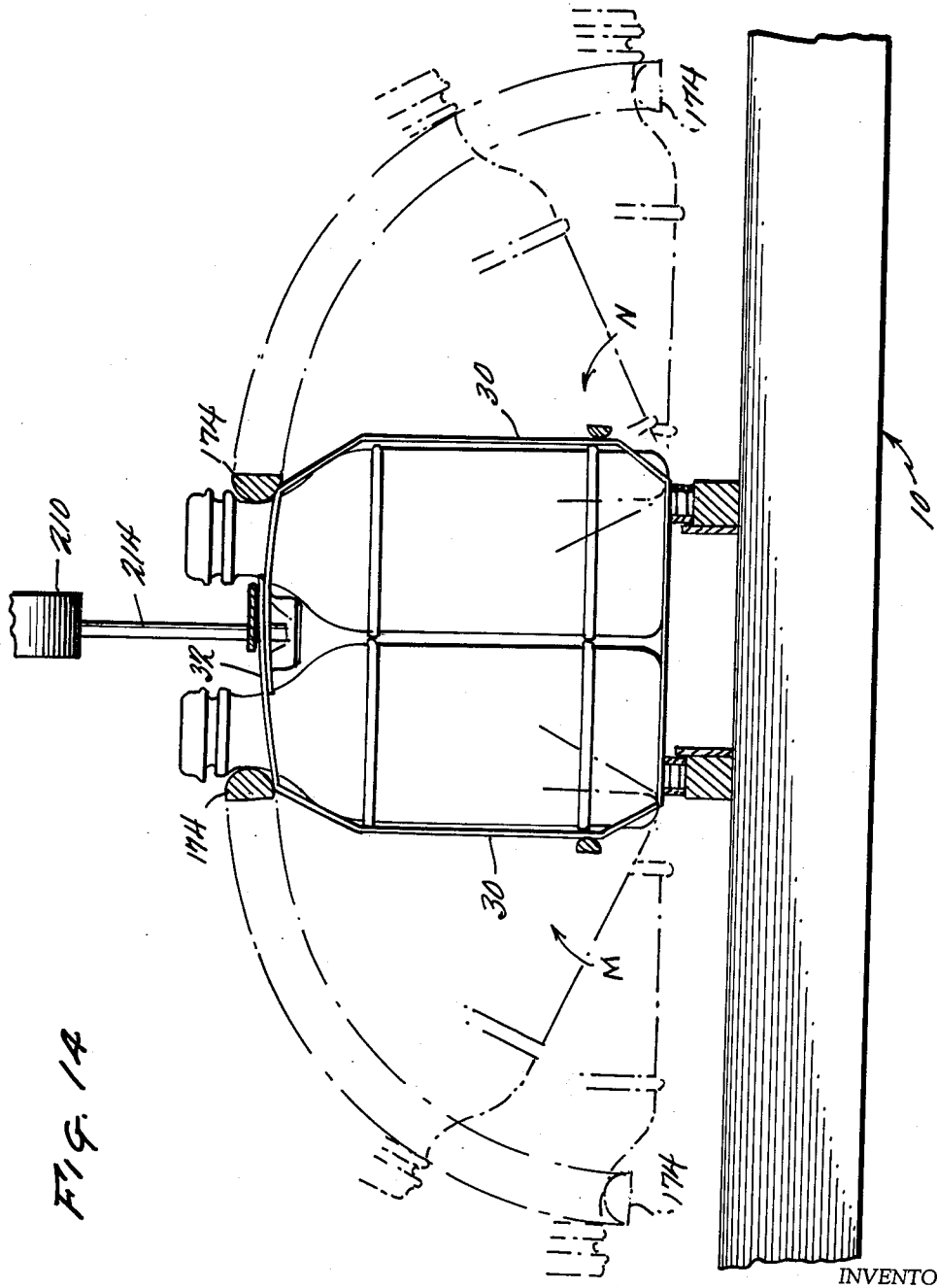

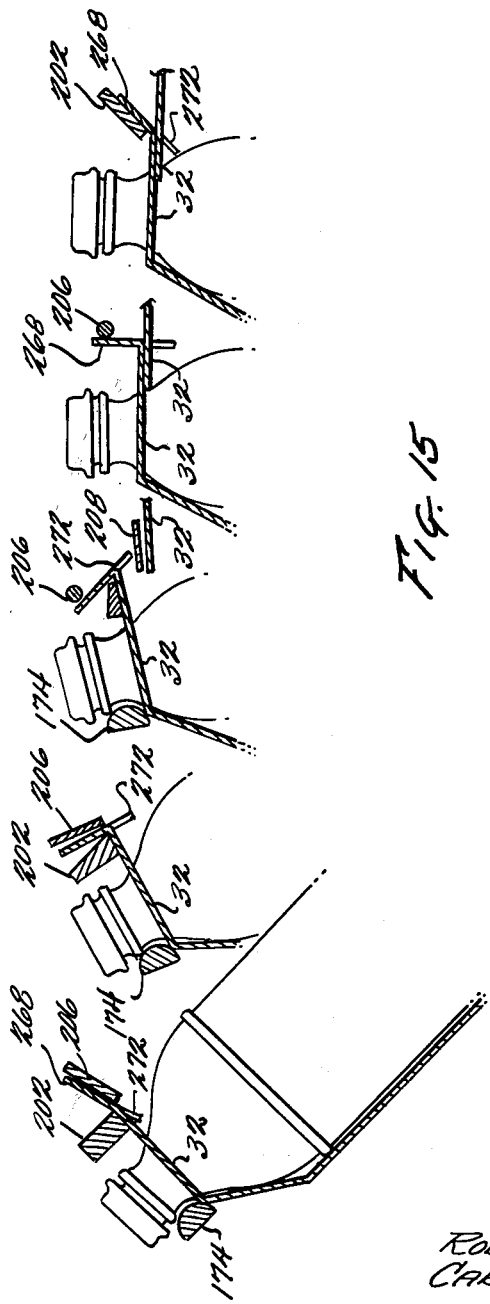

Nov. 26, 1963  R. A. ENGLANDER ETAL  3,111,797
ARTICLE CARRIER, METHOD AND APPARATUS
FOR ERECTING SAME
Filed July 2, 1962  15 Sheets-Sheet 11
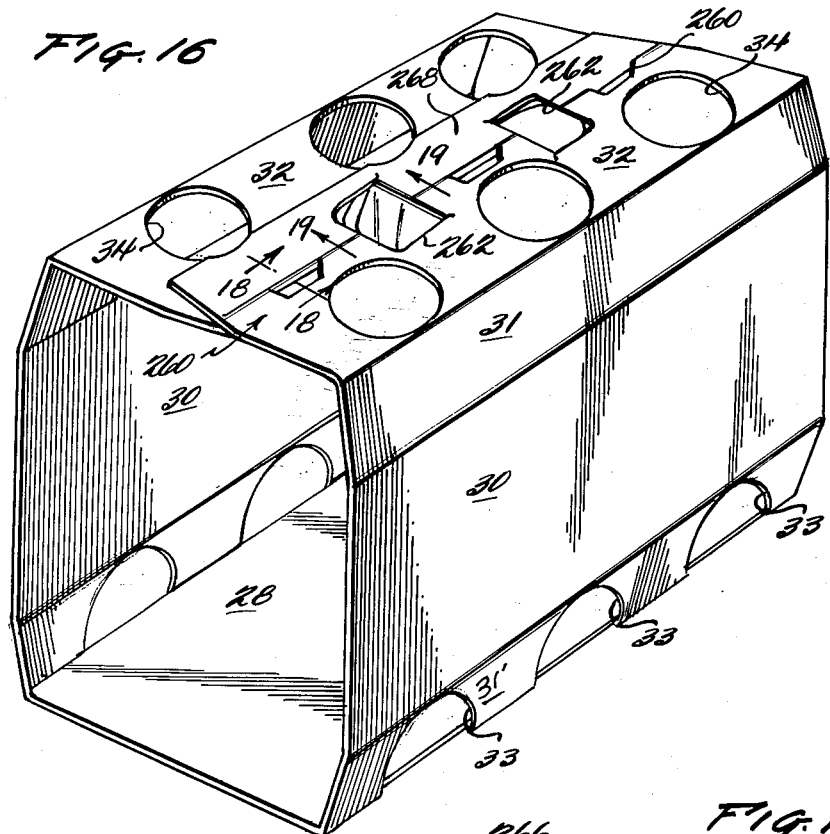
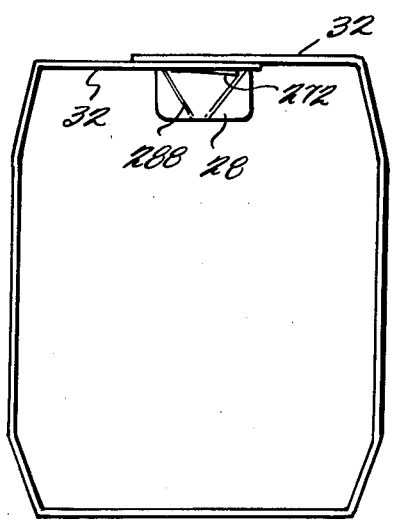
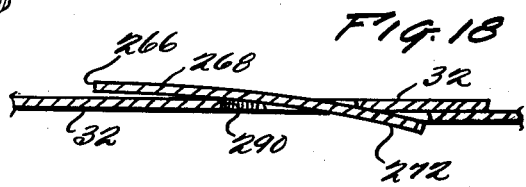
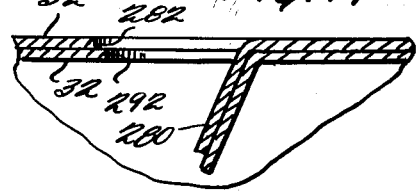
INVENTORS
ROBERT A. ENGLANDER
BY CARL P. CATO
Cushman Darby & Cushman
ATTORNEYS Nov. 26, 1963    R. A. ENGLANDER ETAL    3,111,797
ARTICLE CARRIER, METHOD AND APPARATUS
FOR ERECTING SAME
Filed July 2, 1962    15 Sheets-Sheet 12
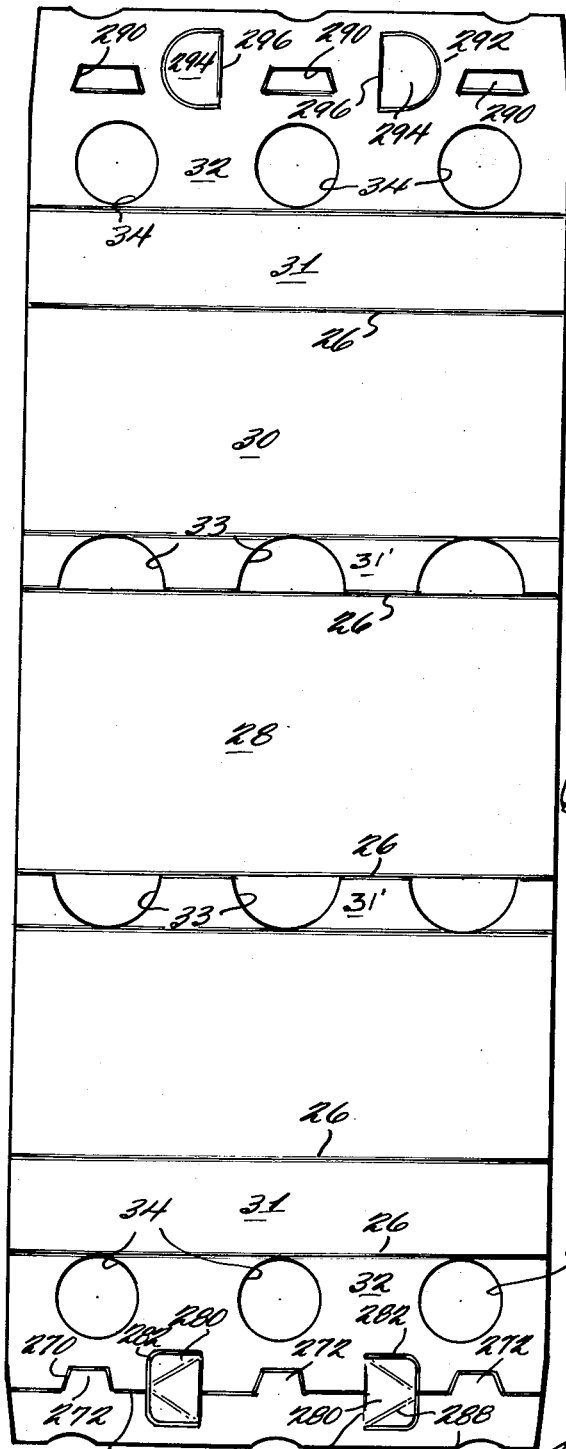
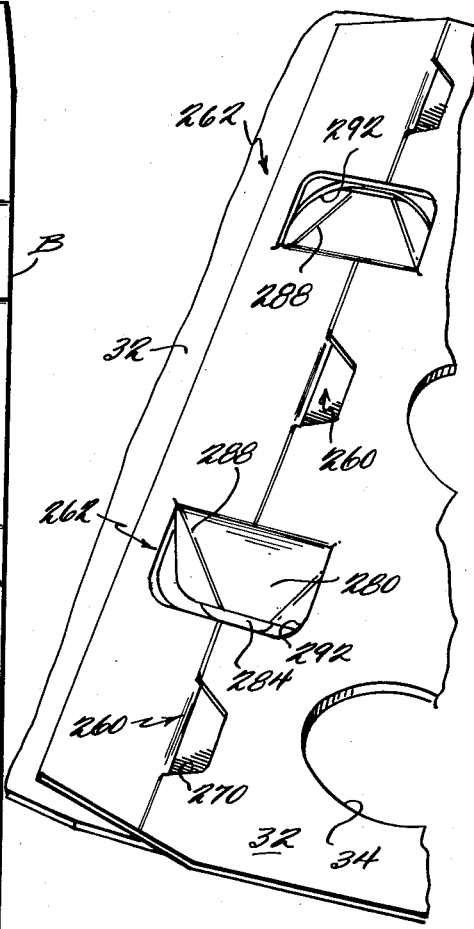
FIG. 21
FIG. 20
INVENTORS
ROBERT A. ENGLANDER
BY CARL P. CATO
Cushman, Darby & Cushman
ATTORNEYS

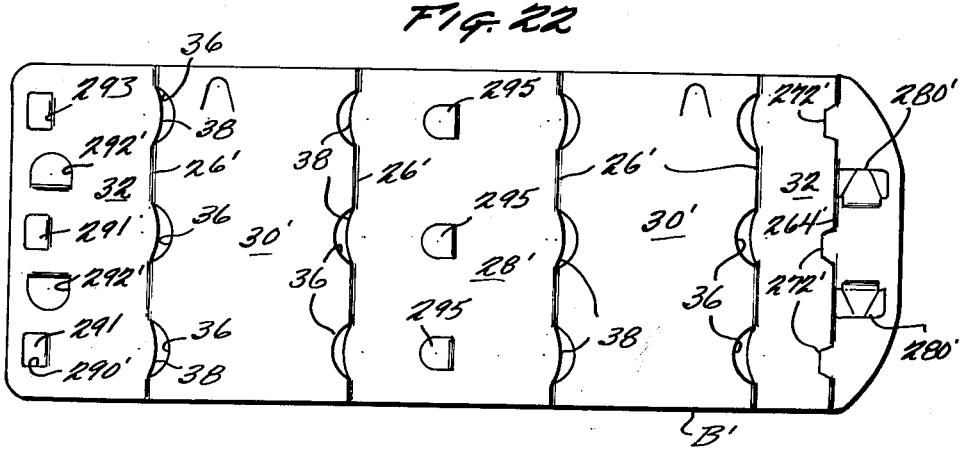
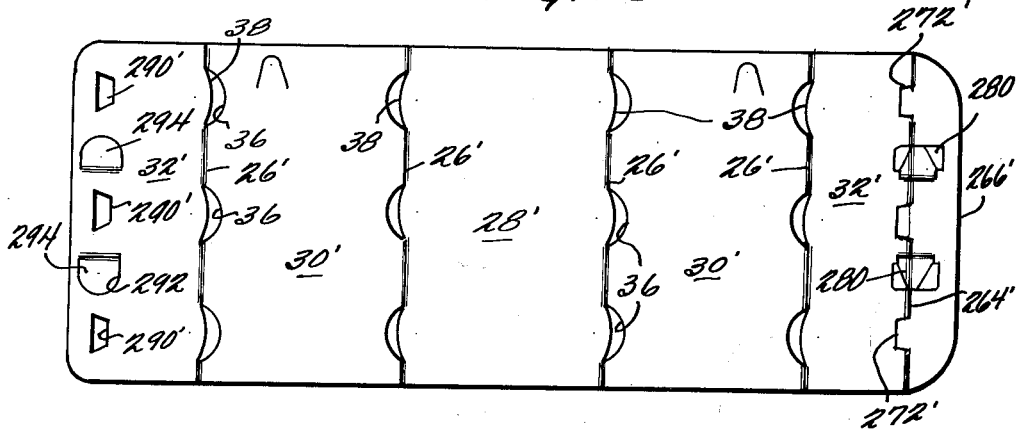
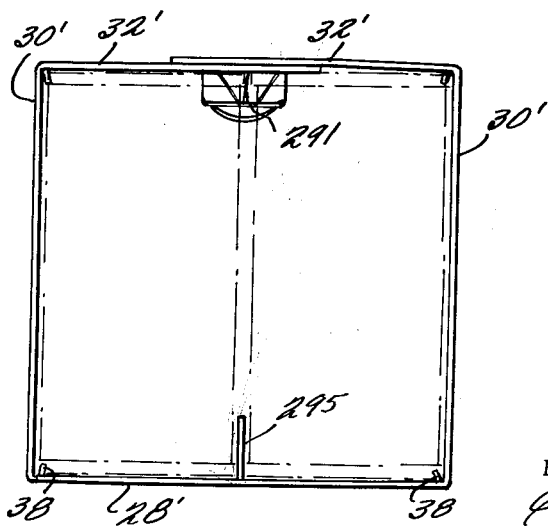
FIG. 22
FIG. 23
FIG. 24
INVENTORS
ROBERT A. ENGLANDER
CARL P. CATO
BY Cushman, Darby & Cushman
ATTORNEYS

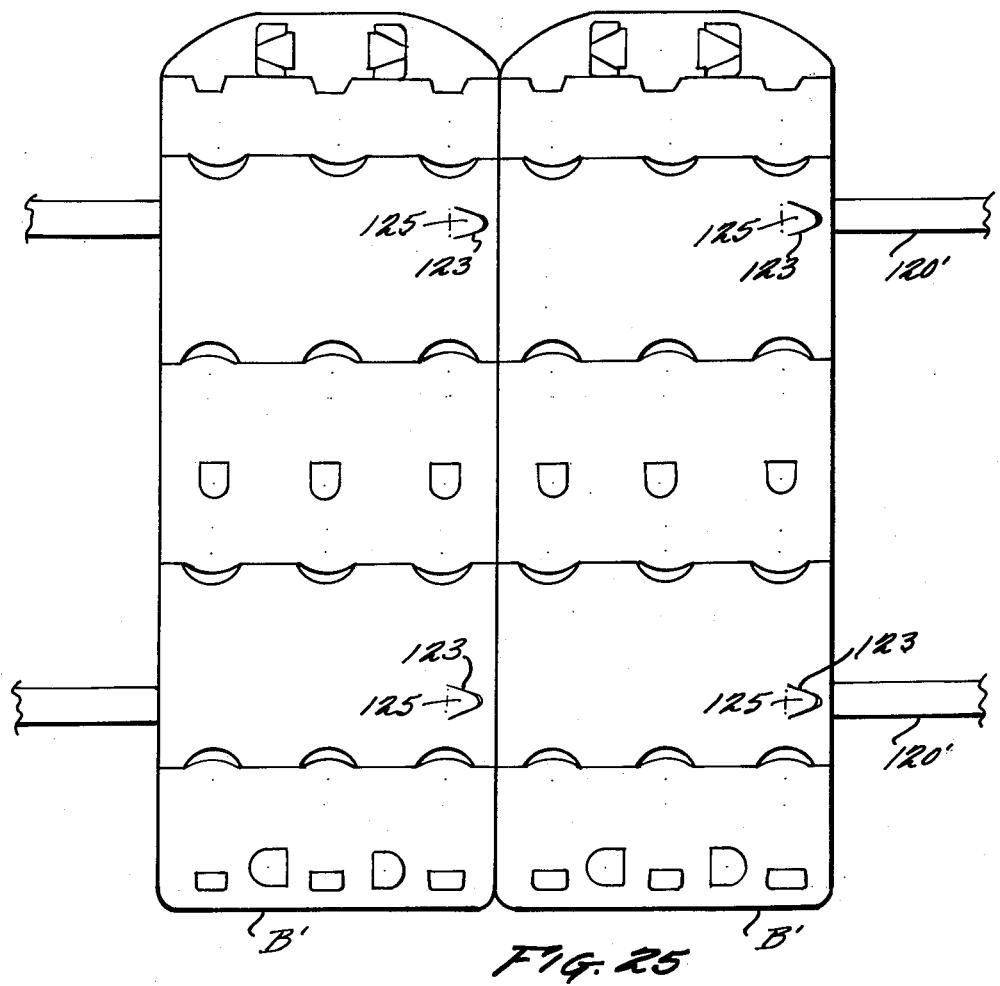
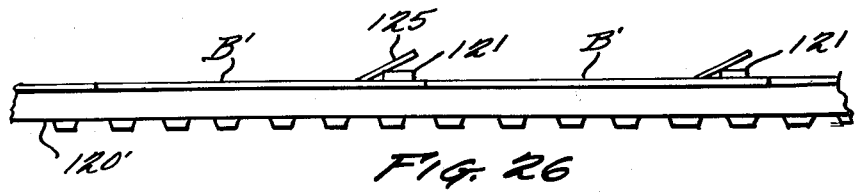

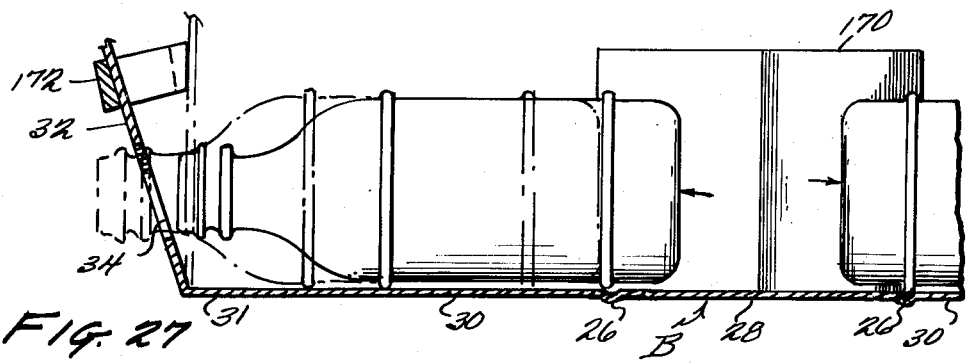
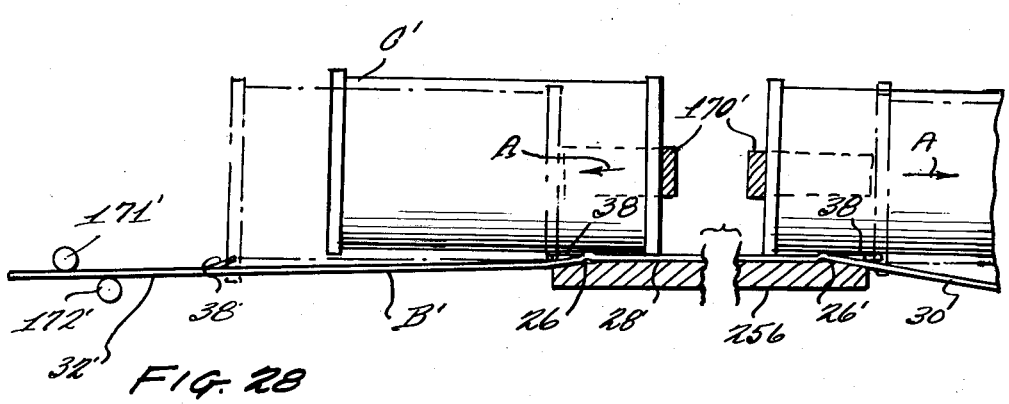
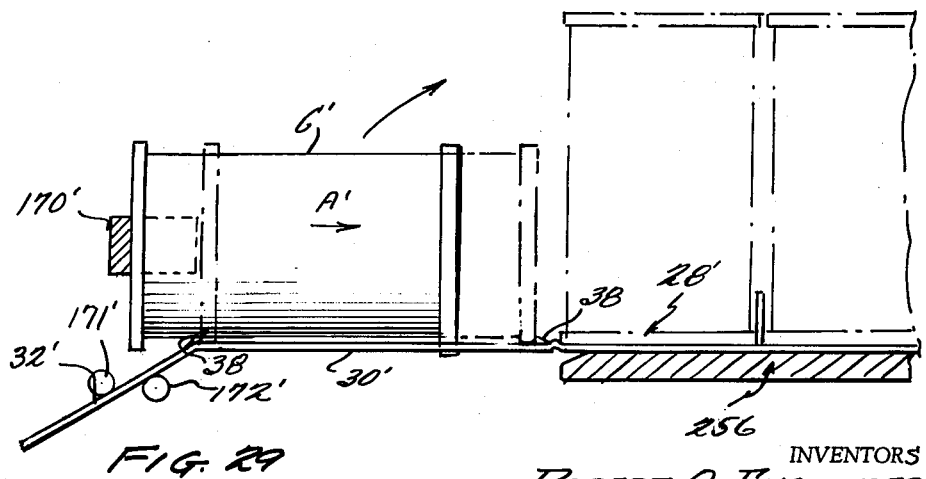

United States Patent Office 3,111,797
Patented Nov. 26, 1963

3,111,797
ARTICLE CARRIER, METHOD AND APPARATUS FOR ERECTING SAME
Robert A. Englander and Carl P. Cato, Lynchburg, Va., assignors to Dacam Corporation, Lynchburg, Va., a corporation of Virginia
Filed July 2, 1962, Ser. No. 206,974
27 Claims. (Cl. 53—48)

The present invention relates generally to the packaging of similar-shaped articles such as cans or bottles into paperboard carries or cartons, and, more particularly, to methods of and apparatus for packaging a group of articles in carriers or cartons which envelope the articles, as well as a carrier or carton adapted for use in such methods and apparatus.

Throughout the specification and drawings, and claims, the articles being packaged are referred to generally as bottles or cans. However, the principles of the invention may be applicable to packaging articles other than bottles or cans. Any article which is generally elongated and which has at least one flat end upon which it can stand upright may be packaged by the method and apparatus of the present invention. The articles may be cylindrical, square, rectangular or any of a various number of shapes. The particular novel carrier or carton disclosed herein may be employed in accomplishing the method of packaging or other cartons may be employed. Likewise, the novel apparatus disclosed herein is but one form of apparatus for accomplishing the aforesaid method.

The most popular means of packaging bottles and cans is a carrier made from a single piece of material such as paperboard or the like, the carrier being generally rectangular in shape, folded about the articles, and having its ends secured to each other to form a tubular or sleeve-type container. Sleeve-type paperboard carriers provide convenient means for carrying small groups of cans or bottles, for example, six, eight, or twelve, the cans or bottles being disposed within the carrier to prevent accidental displacement through the open ends of the carrier. The reference to "sleeve-type" or "tubular-type" carrier throughout the specification and claims is intended to cover those carriers which wrap around a group of articles and which have their ends either open, closed or partially closed. If the ends of the erected carrier are closed or partially closed, then, of course, the carrier blank will be provided with suitable panels for accomplishing the same.

The most convenient means heretofore used for securing the ends of the carrier when it is erected about the articles was by gluing the end panels to each other. However, bottles and cans containing soft drinks or beer, at the time of packaging, usually have a wet exterior as they are received at the packaging apparatus immediately after their filling, closing, and washing. The moisture on the exterior of the bottles or cans oftentimes prevents the adhesive from properly setting, and thus the end panels would pull apart under the load of the contents of the package. Even if such bottles or cans are dry at the time of packaging, the carrier package is often refrigerated and when removed to room temperature, condensation forms on the exterior of the bottles or cans and is absorbed by the carrier and especially its glued joint. This latter condition also oftentimes causes failure of the joint especially when customer is carrying a package from the store. Other difficulties were encountered in the erection of cartons utilizing adhesive for securing the closures, such difficulties occurring in the erection apparatus between the glue-application station and the compression station especially when there was a temporary shut down or feed of packaged articles thereto.

While gluing as a means of securing end panels is still used, the industry has been making an effort to develop glueless cartons or carriers, the cartons or carriers having their end panels locked by purely mechanical means. In some instances, staples have been applied through overlapping end panels but this has proved unsatisfactory and costly from the standpoint of the necessity of utilizing additional packaging equipment for applying the staples as well as a difficulty for the customers to open the cartons. Efforts were also made to secure the end panels of the blank together by punching tongues out of one end panel and pushing the same through openings in the other end panel. However, such prior constructions did not prove entirely satisfactory as they could not assume the load of the articles carried, and oftentimes it was necessary to use auxiliary securing devices such as glue or staples.

An important object of the present invention is to provide an improved method of handling articles as they are being packaged in a sleeve-type carrier as well as an improved apparatus for such handling of the articles and for erecting the carrier about the articles.

Another important object of the present invention is to provide an improved method which contemplates positioning of articles in groups on the carrier while the carrier is laid out as a substantially flat blank, the articles being initially secured to the carrier blank so that, when the carrier blank is erected, the articles will be properly positioned within the erected carrier thus permitting accurate and easy securing of the end panels of the carrier.

Ancillary to the preceding object, it is a further object of the preceding invention to provide a method and apparatus for carrying out the method which contemplates initially positioning and securing the articles in group formation on a substantially flat carrier blank, erecting the carrier blank and securing the end panels of the same while applying proper tension to the carrier about the articles.

A further object of the present invention is to provide an improved method and apparatus in which the assembling of the articles in proper groups on the open carrier blank and the erection of the carrier blank is accomplished in a simplified manner whereby increased production may be realized.

Still another object of the present invention is to provide an improved method and apparatus whereby articles in two rows are arranged in position on an open carrier blank, the articles of one row having their longitudinal axes aligned respectively with the articles of the other row and the articles being preliminarily secured to the carrier blank and then moved to an upright position as the panels of the carrier blank are erected about the articles.

Another important object of the present invention is to provide a method and apparatus for packaging groups of articles in a sleeve-type carrier, the method and apparatus utilizing a substantially straight-line operation which is continuous with no stopping or intermittent motion at any station for performance of any operation in the packaging sequence.

A further object of the present invention is to provide an improved apparatus for automatically packaging groups of articles in carriers made from paperboard carrier blanks, the apparatus having a minimum number of powered moving parts with but a single basic timing adjustment, thus, the apparatus being such that it provides trouble-free operation while accurately positioning articles on a carrier blank and while erecting the carrier blank.

Ancillary to the immediately preceding object, it is a further object of the present invention to provide an improved apparatus for closing an erected carrier by a means other than glue, the closure operation being simplified and positive in action.

Still another object of the present invention is to provide an improved apparatus for packaging groups of articles into sleeve-type carriers, the sleeve-type carriers being fed through the apparatus one at a time in abutting edge relationship. By providing novel means for feeding the carrier blanks through the apparatus as the articles are assembled thereon and the carrier blank is erected, with no spaces between adjacent carrier blanks, the overall speed of packaging is materially increased.

Still a further object of the present invention is to provide an improved apparatus for locking the end panels of a carrier to each other while the carrier and a group of articles enclosed therein is being continuously advanced, the locking means being capable of orienting or timing itself regardless of the speed with which the carrier and its articles pass through the apparatus.

Another object of the present invention is to provide a novel and improved apparatus for packaging bottles or cans in sleeve- or tubular-type carriers, the apparatus being inexpensive to manufacture, economical to operate, and requiring less maintenance and labor to run than prior apparatus of this character.

Ancillary to the preceding object, it is a further object of the present invention to provide an apparatus which may be easily modified or converted to accommodate either cans or bottles or to accommodate cans or bottles of different sizes or to accommodate groups of cans or bottles of different numbers, thus, increasing the utility of the apparatus especially in a small bottler's or canner's plant.

Another object of the present invention is to provide an apparatus capable of packaging bottles or cans at a rate of at least 600 articles per minute whereby a single unit can accommodate a modern-day high-speed filling line. Heretofore, it has been necessary to use one or two relatively expensive packaging apparatus for a high-speed filling line thus necessitating use of expensive article-divider equipment positioned between the filling machines and the packaging apparatus.

Another object of the present invention is to provide a sleeve-type paperboard carrier structure wherein the end panels of the carrier structure are adapted to be overlapped and preliminarily secured together to prevent movement of the panels in the plane of overlap while providing proper tension about the articles packaged, the panels further being provided with a secondary locking means to prevent the panels from separating in a plane transverse to the plane of overlap.

Still another object of the present invention is to provide a carrier blank arrangement having a minimum waste in manufacture, and yet provided with a closure which is extremely durable when the carrier is erected and used, and capable of easy opening by the user.

Ancillary to the preceding object it is a further object to provide a carrier blank capable of being erected as a sleeve-type carrier about a group of bottles or cans, the carrier blank being provided with a glueless closure which is extremely strong yet capable of being easily opened by the consumer and reclosed if necessary.

Still another object of the present invention is to provide a carrier made from a paperboard blank or the like, the carrier having a closure which also functions as a finger hole and thus insures no inadvertent separation of the closure during transfer of the carrier with its packaged articles.

A further object of the present invention is to provide a carrier blank having a novel interlocking closure in its overlapping end panels, the closure also providing means of separating articles from one another.

These and other objects and advantages of the present invention will appear more fully in the following specification, claims and drawings in which:

FIGURE 1 is a side-elevational view of the apparatus of the present invention, a portion at the right-hand side thereof being omitted for purposes of clarity;

FIGURE 2 is a side-elevational view of the apparatus of the present invention and represents a continuation of the right-hand side of the apparatus shown in FIGURE 1;

FIGURE 3 is a top-plan view of the portion of the apparatus illustrated in FIGURE 1;

FIGURE 4 is a top-plan view of the portion of the apparatus illustrated in FIGURE 2, and, thus, is a continuation of FIGURE 3;

FIGURE 5 is an enlarged sectional view taken on the line 5—5 of FIGURE 2 and illustrating the novel rotatable wheel member for closing or securing the overlapping end panels of the carrier together after the carrier blank has been erected;

FIGURE 6 is an enlarged side view of the rotatable wheel member of FIGURE 5;

FIGURE 7 is an enlarged schematic perspective view illustrating the moving parts of the apparatus of the present invention for feeding the carrier blank through the apparatus to a position where articles are received thereon and further feeding the carrier blank with the articles thereon while the carrier blank and articles are being erected;

FIGURE 8 is an enlarged fragmentary perspective view of the article receiving station wherein articles are received on carrier blanks as the carrier blanks progressively move through the apparatus;

FIGURE 9 is an enlarged fragmentary side-elevational view partly in section and illustrating the timing or conveying means for feeding a carrier blank to and through the article receiving station;

FIGURE 10 is a fragmentary plan view, partly in section, of FIGURE 9;

FIGURE 11 is a fragmentary plan view, partly in section, and illustrating the supply hopper for a stack of carrier blanks and the means for stripping or feeding one blank from the bottom of the stack of blanks;

FIGURE 12 is a fragmentary side-elevational view of the means for feeding one blank from the bottom of the stack of blanks to the conveyor or timing means;

FIGURE 13 is a simplified schematic wiring diagram for the apparatus of the present invention;

FIGURE 14 is a schematic view illustrating the erection of the carrier by the erection helix or guide rails after articles have been properly positioned on the carrier blank, the articles being shown as bottles;

FIGURE 15 is a further schematic view similar to FIGURE 14 but illustrating in detail the applying of the preliminary securing means for the closure of the overlapping end panels of the carrier blank;

FIGURE 16 is a perspective view illustrating one form of carrier of the present invention;

FIGURE 17 is an end-elevational view of the carrier of FIGURE 16, looking into the open end of the same;

FIGURE 18 is a sectional view taken substantially on the line 18—18 of FIGURE 16;

FIGURE 19 is a sectional view taken substantially on line 19—19 of FIGURE 16;

FIGURE 20 is a plan view of the paperboard carrier blank from which the carrier of FIGURE 16 is erected;

FIGURE 21 is a fragmentary perspective view illustrating the interlocking of the overlapping closure panels of the improved carrier;

FIGURE 22 is a plan view of a blank for a modified form of carrier in which the articles packaged are cans and in which the cans are separated by suitable separator tabs;

FIGURE 23 is a plan view of a blank for a still further modified form of carrier, the carrier erected from the blank of FIGURE 23 being also utilized for packaging cans;

FIGURE 24 illustrates the end view of a carrier made from the blank of FIGURE 22;

FIGURE 25 illustrates a modified form of feeding means for carrier blanks to the article receiving station, the feeding means permitting the feed of the carrier blanks in abutting-edge relationship;

FIGURE 26 is a side view of a portion of the feeding means of FIGURE 25;

FIGURE 27 is a schematic view of the apparatus of FIGURES 1 through 15 and illustrates the movement of the bottles into registry with openings in the end panels after the bottles are initially positioned adjacent the side panels of the carrier blank;

FIGURE 28 is a view similar to FIGURE 27 but illustrates a slightly modified form of apparatus wherein the articles are cans;

FIGURE 29 is a schematic view of a modification of the apparatus of FIGURE 28 and illustrates the securing of the cans to the blanks by moving the cans toward each other.

*Method of Packaging Articles in Paperboard Carriers or Cartons*

Referring now to the drawings wherein like character and reference numerals represent like or similar parts, the novel apparatus illustrated in FIGURES 1 to 15 inclusive and 27, as well as the modifications of the apparatus illustrated in FIGURES 26, 28 and 29, is capable of use in practicing the method of the present invention. Further, the novel paperboard carton or carrier and its modifications as illustrated in the drawings may be used in practicing the method of the present invention. However, it will be understood at the outset, the method of packaging groups of articles such as bottles or cans in the paperboard carrier may be accomplished by other apparatus or by hand. Also, while the method of packaging will be described in connection with the improved sleeve-type carrier of the present invention having a novel closure for overlapping panels of the same, it will be understood to be within the scope of the present invention to practice the method on other sleeve-type carriers having materially different closures for the end panels of the carrier blank which form a composite wall of the erected carrier.

In order that the method of packaging articles in paperboard carriers or cartons according to the present invention may be readily understood, a brief description of the apparatus of the present invention will be made at the outset of the specification, the detailed description of the apparatus following later in the specification under the heading Apparatus for Packaging Articles in Paperboard Carriers. Likewise, the carrier or carton will be briefly described at this time with reference to the drawings, but a detailed description of the novel carrier or carton will appear later in the specification under the heading Carrier or Carton.

Referring to FIGURES 1 to 4 inclusive, the apparatus of the present invention includes a frame structure 10 on which is provided an article infeed station 12, a carton or carrier blank supply station 14, an article receiving station 16 where the articles are received on the carrier blanks, and a carrier erection and closing station 20. Articles C such as bottles or cans are fed in double file or in single file or row on a flat-top conveyor 22 from the usual bottle filling and capping machines or can closing machines respectively, to the article infeed station 12 wherein the upstanding articles are diverged into two rows or files, if initially in single file, by a divider member 24. The two rows of upstanding articles are fed down an incline toward the article receiving station 16. As the two rows of articles are fed down the incline toward the article receiving station 16, the two rows are rotated 90 degrees in opposite directions so that by the time the two rows of articles are received at the article receiving station 16, they are lying on their sides with their longitudinal axes horizontal and the longitudinal axes of one row of articles being coincident with the longitudinal axes of the other row of articles.

While the two rows of articles C are being rotated, one in a clockwise direction and the other in a counter-clockwise direction, they are also separated from one another so that the base ends of the articles in one row are opposed and spaced a predetermined distance from the base ends of the articles in the other row when the advancing rows reach the article receiving station 16. In the case of bottles or cans, the base ends of such articles of one row are spaced from the base ends of such articles of the other row, at the receiving station 16, by a distance less than two article diameters, and preferably in the range of one article diameter. On the other hand, it is also possible to package cans by having the two rows of cans rotated or oriented so that the base ends of the cans of one row oppose the base ends of the cans of the other row and are spaced apart therefrom at the article receiving station by a distance greater than two can diameters.

In timed sequence with the feeding of articles C to the article receiving station 16, carrier blank B is fed from the stack of carrier blanks at the carrier blank supply station 14 to and through the article receiving station 16. The carrier blank B is fed to the article receiving station 16 in a substantially flat condition and the articles C from the respective rows of articles are successively positioned on the flat carrier blank as the carrier blank passes through the article receiving station.

Referring briefly to FIGURES 20 and 27, a carrier blank B for bottles is disclosed. The carrier blank B is made from paperboard or the like material and is provided with a plurality of score lines 26, upon which folds can be made, the score lines being spaced apart proportionately for defining a bottom panel 28, side panels 30, and end panels 32 of a size adapted to overlap and define a composite wall when the carrier blank is erected. Each side panel 30 for a bottle carrier is usually provided with subdivisions such as an upper portion 31 which is adapted to fold at an angle to the main portion, the upper portion connecting the main portion to the end panel, and a lower portion 31' also folded at an angle to the main portion and connecting the same to the bottom panel. It will be appreciated that the score lines 26 are so spaced apart on the carrier blank that, when folds are made along these lines to envelope the bottles, the erected carrier will have a desired degree of tightness about the bottles. Cutouts 33 may be provided in the side panels 30, the cutouts 33 being capable of receiving a portion of the base end of the bottle when the carrier is erected. The rectangular-shaped carried blank B is provided with cutouts 34 in the end panels 32 for receiving the neck portion of the bottles as will be explained in more detail below.

It will be understood that the width of the carrier blank B and the number of cutouts 34 in each end panel 32 will determine the number of bottles from each row received by the carrier. The blank B shown in FIGURE 20 is for a six-bottle package, i.e. two rows of three bottles each. In the present-day packaging of bottles, there are sleeve-type carrier blanks for eight bottles, and, even in some instances, twelve bottles.

Referring to FIGURES 22, 23 and 28 and 29, sleeve-type carrier blanks for cans are disclosed. The carrier blanks B' for cans are provided with a plurality of score lines 26', the score lines 26' being spaced apart proportionately to define a bottom panel 28', side panels 30', and end panels 32'. The end panels 32' are of such dimension as to overlap and provide a composite wall of the erected carrier. Crescent-shaped cutouts 36 are provided in each of the side panels 30', there being a plurality of pairs of opposed crescent-shaped cutouts 36 in each side panel 30'. The crescent-shaped cutouts 36 have their tips terminating at or adjacent the fold lines 26' for the respective end panel 30' and define tabs 38 which extend from the bottom panel 28' and end panels 32' which interrupt the fold lines. Oppositely disposed pairs of tabs 38, as defined by the pairs of crescent-shaped cutouts 36, are adapted to be received within the chines at the opposite end of a can to retain the can on the flat blank B' as the blank is being erected into a carrier.

Returning now to the description of the method for packaging articles, the method will be first described with respect to packaging articles such as bottles into carrier blanks B of the type generally disclosed in FIGURE 20. As mentioned above, the carrier blank B is fed to the article receiving station 16 and two rows of three bottles each are positioned on the flat carrier blank, the bottles having their opposed base ends spaced apart a distance less than the distance of two bottle diameters. It will now be appreciated that the bottles of the two rows are arranged on the carrier blank in a horizontal position with their neck portions extending generally toward the outer panels 32 of the carrier blank. The outer panels 32 of the carrier blank B are then folded upwardly so that the cutouts 34, which define apertures, are generally aligned with the neck portion of the bottles. The carrier blank, together with the horizontally positioned bottles, is then advanced as the bottles of both rows are pushed outwardly of each other along their longitudinal axes so that the neck portions of the bottles extend through the apertures defined by the cutouts 34. When the bottles have been pushed apart to a position where the base ends of one row of bottles are substantially two diameters from the base ends of the other row of bottles, it will be appreciated that the walls of the bottles will be in a substantially contiguous relationship and in proper position with respect to the side panels 30 of the open carrier blank. At this point, the carrier blank is erected into the carrier package by pivoting the side panels 30 with respect to the bottom panel 28 until the side panels are generally parallel and vertical. Since the bottles are temporarily retained in position by the extension of their necks through the aperture 34, the bottles of the two rows of bottles on the carrier blank are rotated from a horizontal position to an upright position with their base ends being received on the bottom panel 28. The end panels 32 having been previously folded with respect to the side panels 30, are further folded during the erection of the side panels 30 to a position where they overlap and form a composite wall of the erected sleeve-type carrier which at least partially envelopes the bottles positioned therein. The overlapping end panels 32 are then secured together in any suitable manner or as disclosed in the drawings, by initially securing the end panels against movement outwardly of each other in the plane of overlap, and then secondarily securing the end panels to interlock the same against movement away from each other in a plane substantially transverse to the plane of overlap of the end panels. The novel and improved closure for the end panels 32 will be described in detail later in the specification under the heading Carrier or Carton.

When articles such as cans are being packaged according to the method of the present invention, the cans are initially positioned on the carrier blank B' with the base ends of the cans of one row spaced apart with respect to the base ends of the cans of the other row a distance less than two diameters just as in the case of the bottles. The side panels 30' as well as the end panels 32' are folded in a reverse direction slightly downwardly of the plane of the bottom panel 28' so that the innermost tabs 38 of each pair of tabs, defined by the crescent-shaped cutouts 36, extend slightly out of the planes of the respective panels. The cans of each row are moved outwardly in the direction of arrow A from their innermost position, as shown in the full lines of FIGURE 28, until the tabs 38 of the end panels 32' engage within the chines of the respective cans. However, it will be appreciated that immediately before the movement of the cans outwardly, the end panels 32' should be folded slightly out of the plane of the side panels 30' so that the tabs 38 of the end panels are in a position to engage within the chines of the cans. As soon as the cans have engaged tabs 38 of the end panels 30', the base ends of the cans will be resting on the tabs 38' of the bottom panel 28' and then the base ends of the cans are depressed so that the tabs 38 in the bottom panels 28' snap past the chines and engage within the same. The carrier blank B', after the cans have been secured thereto, is then erected and its end panels secured in a manner described above.

A slightly modified method for packaging cans in the carrier blank B' is disclosed in FIGURE 29. According to this method, the carrier blank B', when laid out in substantially flat position, is fed to the article receiving station 16 in a manner substantially similar to that described above. Cans are received on the blank B' in generally the same manner as described above in that two rows of cans which are horizontally arranged and which have longitudinal axes of one row coincident with the respective longitudinal axes of the other row are positioned on the blank B'. However, the cans are initially positioned on the carrier blank B' with the base ends of the cans of one row spaced apart with respect to the base ends of cans of the other row a distance greater than two diameters as shown in the full lines of FIGURE 29. The side panels 30', as well as the end panels 32', are folded in a reverse direction slightly downwardly of the plane of the bottom panel 28' in a manner similar to that shown in FIGURE 28 so that the innermost tabs 38 of each pair of tabs, defined by the crescent-shaped cutouts 36, extend slightly out of the planes of the respective side panels 30'. The cans of each row of cans are moved from their outermost position, as shown in full lines in the direction of the arrows A' toward each other until the tabs 38 extending from the bottom panel 28' engage within the chines of the respective cans.

The broken-line position of the cans in FIGURE 29 illustrates the cans of the respective rows moved to their innermost position and with the tabs 38 engaging within their chines. When the cans are in this latter position, the base ends of the cans of one row oppose and are spaced from the base ends of the cans of the other row by two can diameters. After the cans have their base ends engaging the tabs 38 extending from the bottom panel 28', the two side panels 30' are moved up to a substantially horizontal position as shown in FIGURE 29, the end panel 32' being folded downwardly with respect to the side panels 30' so that the tabs 38 extending from the end panels 32' may be snapped over and received within the chines at the opposite ends of the rows of cans respectively. The end panels 32' are then released so that they can assume a position substantially co-planar with the panels 30'.

With the cans secured in position on the panels 30', as shown in FIGURE 29, the side panels 30' may then be folded with respect to the bottom panel 28' and, as the panels 30' are folded, the cans of the two rows are rotated in an opposed direction until they stand upright on the bottom panel 28', as shown in broken lines in FIGURE 29. As the side panels 20' are being erected to a substantially parallel position with the cans of one row moved to a side-by-side position with the cans of the other row, the end panels 32' can begin to be folded with respect to the side panels 30' so that, when the cans are upright on the bottom panel 28', the end panels 32' overlap and form a composite wall for the carrier. With the panels 32' overlapped, they are then secured together by initially securing the same to each other against outward movement of the end panels in the plane of overlap and then secondarily securing the end panels to interlock the same against movement away from each other in a plane substantially transverse to the plane of overlap of the end panels.

In packaging of either bottles or cans, the method of packaging includes erecting the carrier blank about the articles as the carrier blank, with the articles positioned thereon, is moved from the article receiving station 16. Immediately after the articles are preliminarily positioned on the carrier blank, i.e., their longitudinal axes generally parallel to the carrier blank, the articles are then at least temporarily secured to the carrier blank so that the erection and closing of the carrier blank can be efficiently and quickly accomplished. The erection of the carrier blank occurs as the carrier blank and articles move up an incline toward a position where the erected carrier is finally closed.

In the case of packaging bottles, the side panels 32 of the carrier blank can be erected by engaging the neck portion of the bottles and causing the bottles of each row to rotate in an opposite direction toward each other and toward an upright position on the bottom panel 28. This causes the side panels 32 to be erected to a proper position. On the other hand, after the cans have been temporarily secured to a carrier blank, the side panels 32' of the carrier blank B' are engaged on their opposite wall from the wall supporting the cans, and the side walls 32' are pivoted in opposite directions, carrying with them the respective rows of cans.

While the method of the present invention has been described with respect to utilizing sleeve-type carrier blanks having a means thereon for at least temporarily securing the articles in position on the side panels of the blank while the blank is in a generally flat position, it will, of course, be understood, other methods of at least temporarily securing the articles with side walls adjacent the side panels of the flat carrier blank could be utilized. For example, the articles could be temporarily taped to the side panels of the carrier blank or they could be adhesively secured in the position described. Also, while the method of the present invention has been described in connection with the novel closure for sleeve-type carriers or cartons disclosed herein, other types of closures for sleeve-type carriers or cartons would fall within the method of the invention.

The method has been described in detail in packaging of two rows of articles, however, it is within the scope of the invention to package a single row or multiple rows of articles by orienting the articles with respect to the carrier blank and then at least temporarily securing the articles to the blank prior to erection of blank about the articles.

*Apparatus for Packaging Articles in Paperboard Carriers*

Referring now to FIGURES 1 through 15 inclusive, and 27, one form of the novel apparatus for packaging articles in accordance with the present invention is illustrated. The apparatus of these figures is specifically adapted to package cylindrical-shaped articles such as bottles having a flat base end and a narrow neck portion upon which a crown-type closure or the like is applied. Usually such bottles are for soft drinks and beer, however, bottles containing other products may be packaged in sleeve-type carriers by this apparatus. The sleeve- or tubular-type carrier is a carrier which envelopes a group of articles and, in the case where the articles are bottles, the neck portion of the bottles usually extends through suitable openings in the top of the carrier. While the apparatus of the aforementioned figures of the drawings is primarily for bottles, it may be used to package cans in sleeve-type carriers with some minor modifications as will be described in detail later in this specification.

The apparatus, as heretofore previously described, includes the frame structure 10, upon which is provided the article infeed station 12, the carrier blank supply station 14, the article receiving station 16, and the carrier erection and closing station 20. Frame structure 10 includes a plurality of vertical standards 40 and 42, secured together by cross members 44 and 46 fixedly attached at their lower ends. The vertical standards 40 and 42 are of different lengths. Attached to the upper ends of standards 40 and 42, as shown in FIGURES 1 and 3, are a pair of rail members 48 and 50 extending upwardly at an acute angle to a horizontal. A plurality of U-shaped beams or channel members 52 extend between, and are fixedly secured at their ends, to the rail members 48 and 50. The U-shaped beams 52 provide rigidity for the frame structure 10 in order that the various components which make up the apparatus can be supported thereon.

The carrier blank supply station 14 is best shown in FIGURE 1, at the left-hand or lower side of the frame structure 10, and also in FIGURES 11 and 12. The station 14 is provided with a pair of upstanding posts 54, the posts being suitably supported on the frame structure 10 and providing means for support of the rear edge of a stack S of carrier blanks. The side edges of the stack S are supported between upstanding plates 56 carried on the frame structure 10 by a pair of L-shaped frame members 58 which support the bottom of the stack S of carrier blanks B.

A pair of stripper elements 60, arranged to reciprocate back and forth, are adapted to engage the rear edge of the lowermost carrier blank B and advance the same from beneath the stack to a timing conveyer means 62. In more detail, a shaft 64, rotatably mounted between the side rails 48 and 50 carries a cam 66. A second shaft 68 rotatably mounted between the side rails 48 and 50 is provided with a cam follower 70 which engages the periphery of the cam 66. The shaft 68 also is provided with a pair of lever arms 72 fixed thereto, the lever arms 72 being respectively pivotally connected at their free ends to the lower portion of the stripper elements 60. Stripper elements 60 are provided with bores 61 therethrough adapted to reciprocate on rods 76 which extend between suitable cross members 52. A spring 78 connected to the frame structure 52, and to at least one of the lever arms 72, maintains the cam follower 70 always in engagement with the cam surface of cam 66.

It will now be evident that, upon continuous rotation of the shaft 64, the cam follower 70 is oscillated back and forth by the cam 66, and this causes the shaft 68 to rock back and forth, further causing the lever 72 to reciprocate the stripper elements to strip the bottommost carrier blank B from the stack S. It will be noted that the rods 76, upon which each of the stripper elements 60 is adapted to reciprocate, are circular in cross-section, as are the bores 61 of stripper elements, so that the stripper elements can have a slight pivotal motion around the respective axes of their reciprocating motion. By providing a slight pivotal or rocking motion to the stripper elements, the stripper elements can accommodate themselves to the carrier blanks which are centrally supported by a bar 77 having an upper-beveled surface 79, it being understood that the carrier blanks are made from a paperboard material which is somewhat flexible. The pivoting motion of the stripper elements insures positive stripping of the lowermost carrier blank from the stack S. A pair of guide strips 81, carried on the member 52, support the carrier blank B as it is transferred to the timing conveyer means 62.

As best shown in FIGURES 11 and 12, the supply station 14 is provided with a means to permit full loading of carrier blanks therein without the entire weight of the stack resting on the reciprocating stripper elements or shoes 60. In more detail, a bar 55 is supported by the adjustable brackets 57 between the vertical posts 54 at a proper elevation above the reciprocating stripper elements 60. The leading edge 59 of the bar 55 extends slightly into the area where the stack of carrier blanks S is stored and supports the upper portion of the stack as shown in FIGURE 12. Since the bar supports half the weight of a complete stack, the hopper can be filled with more carrier blanks without the chance of overburdening the stripper elements 60. When the lower pile of carrier blanks decreased, the angle of the carrier blanks in the upper pile as determined by the position of the bar, increased to a point where several of the lowermost carrier blanks in the upper pile fall from the upper pile past the bar onto the lower pile.

The article infeed station 12 includes an article supporting plate member 80 (FIGURE 3) carried on the upper end of a pair of rail members 82 (FIGURE 1) extending upwardly at a position adjacent the article receiving station 16 to a position immediately above the carrier blank supply station or hopper 14. Plate member 80 at 81 has its surface level with the flat-top infeed conveyer 22, the surface then gently curving downwardly toward the article receiving station 16. A pair of guide plates 84 and 86 are carried above the plate member and define a path for the single row of articles C received from the conveyer 22 to a throat 88 where a divider member provides separate downwardly-inclined paths 90 and 92 for the articles C. The articles C are transferred onto the plate member 80 from the conveyer 22 and moved then by gravity into the widened throat 88 where some of the articles slide down the path 90 while others slide down the path 92. Guide rails 94, 96, 98 and 100 provide an extension of path 90 and receive the articles moving by gravity down the incline path 90 and define a helical path which causes the articles traveling generally upright on the plate 80 to be rotated approximately 90 degrees to a horizontal position by the time they are discharged at the article receiving station 16. A support rail 101 engages the base ends of the articles C as they leave the plate 80 and supports the same as they travel down the path defined by the rails 94, 96, 98 and 100. The path 92 feeds articles to the guide rails 102, 104, 106 and 108 which define a similar path for the articles but which rotate the articles in this particular row 90 degrees in an opposite direction so that the flat base ends of the articles in this row face the flat base ends of the articles in the previously-described row. A support rail 107 similar to rail 101 cooperates with rails 102, 104, 106 and 108 to support articles traveling in the path defined thereby.

At the discharge ends of the guide rails 94, 96, 98 and 100 and 102, 104, 106 and 108 are a pair of star wheels 110 and 112 for respectively receiving the two rows of articles. The star wheels 110 and 112 are carried on a horizontally-extending shaft 114 rotatably mounted in bearings 116 carried on the frame structure 10. The star wheels 110 and 112 rotate in the direction of the arrow D in FIGURE 1 and the pockets of the respective star wheels simultaneously receive a pair of horizontally-positioned articles having their base ends opposed and spaced apart, the articles being coaxially aligned with each other. The star wheels 110 and 112 progressively discharge pairs of articles on a carrier blank being fed therebeneath by the timing conveyer means 62. Also cooperating with the discharge ends of the guide rails 94, 96, 98 and 100 and 102, 104, and 106 are plates 109 (FIGURE 8) for engaging the tops of the articles and mounting the same in proper position to be received by the star wheels 110 and 112.

The timing conveyer means 62, which operates to feed a carrier blank beneath the star wheels 110 and 112 in timed sequence with the rotation of the star wheels, is best shown in FIGURES 9 and 10, and includes a pair of spaced endless conveyer belts or chains 120 in a spaced side-by-side relationship and extending about sprockets 122 and 124. Idler sprockets 126 and 128 are provided intermediate sprockets 122 and 124 in order to support the upper run of the belts 120 which receive the flat blank carrier blank B from the stripper element 60. The sprockets 124 for both belts 120 are carried on a drive shaft 130, rotatably supported in the frame structure 10, whereas the sprockets 122, 126 and 128 are carried on stub shafts 132, 134 and 136 respectively. Cooperating with the upper run of each belt 120 are pairs of pressure rollers 138 and 140 respectively, the pressure rollers being freely-rotatably mounted on the ends of levers 142 and 144. The levers for each pair of pressure rollers are pivotally supported by shaft 146. Springs 148 and 150 connected to the frame structure 10 and to the free ends of the levers 142 and 144 respectively, urge the rollers 138 and 140 toward the upper run of the belts 120. A further pressure roller 152 is provided for each belt 120 and is carried on a lever arm 154 that is pivotally mounted at 156. As shown in FIGURE 9, the free end of the lever arm 154 is also connected to the spring 148 so that the roller 152 is constantly urged downwardly toward the upper run of the belts 120.

A roller 160 carried on a lever arm 162, rides on the upper run of the belts 120 and provides a means for indicating the presence or absence of a carrier blank on the belts. In more detail, the lever arm 162 is pivotally connected at 164, the free end of the arm 162 resting on a leaf spring 166. The leaf spring 166 is adapted to actuate a switch 168 to either open or close the same depending on the position of the roller 160.

Referring now to FIGURES 25 and 26, a modification of the belt 120 is disclosed. In the modified belts 120, the outer surface of each is provided with a plurality of upstanding lugs 121 spaced apart a distance equal to the width of the carrier blank B. By providing the carrier blank with a pair of cut lines 123 in the respective side panels of the same and in which a tab 125 can be pushed out to define an opening, the lugs 121 of the belts 120' can extend upwardly through the openings and thus the carrier blanks can be fed in abutting-edge relationship. By feeding the carrier blanks in abutting-edge relationship, the carrier blanks can be successively filled with articles with no loss of time necessary due to spacing of one blank from another blank.

As best shown in FIGURE 3, a diverger member 170 is provided on the outfeed side and between the star wheels 110 and 112. The diverger member 170 is adapted to engage simultaneously bottles positioned horizontally on the carrier blank (FIGURE 27) and urge the bottles outwardly on their longitudinal axes so that the neck portions of the bottles extend through the openings 34 in the end panels of the carrier blank. However, prior to engagement of the base ends of coaxially aligned bottles by the diverger member 170, it is necessary that the end panels 32 of the carrier blank be turned upwardly so that their cutouts or openings 34 are aligned with the neck portions of the bottles. In order to accomplish this, a guide rail 172 for each of the end panels 32 extends from a position forward of the article receiving station 16 and engages the respective end panels 32 while the blank is substantially flat and progressively turns the same upwardly to the position shown in FIGURE 27. The diverger member 170 will then push the neck portions of the bottles through the cutouts 34 as shown in the dotted-line position of FIGURE 27.

Also extending from a position forward of the article receiving station 16 is a guide rail 174 for erecting each of the side panels 30 of the carrier blank after the bottles have been secured to the carrier blank B by inserting the same through the openings 34. The guide rails 174 define a helical erection means actually engage the necks of the bottles as illustrated in FIGURE 14 and raises them, along with the side panels 30, in the direction of the arrows M and N. Once the bottles of the rows of bottles have been moved to an upright position, the side walls 30 will be substantially parallel and the rows of bottles within the erected carrier will be in a side-by-side position.

While the guide rails 174 are erecting the side walls of the carrier blank B about articles C, the carrier blank is transferred up an incline by means of an endless conveyer 176, comprising a pair of spaced conveyer belts or chains 178 and 180, passing over drive sprockets 182 and idler sprockets 184. The drive sprockets 182 are carried on a drive shaft 186 rotatably mounted in the frame structure 10 beneath the drive shaft 114 whereas the idler sprockets 184 are mounted on a shaft 188 carried at the upper end of the inclined rails 48 and 50. The chains or belts 178 and 180 are spaced apart a distance no greater than the width of the base panel 28 of the carrier blank and frictionally engage the same and assist the movement of the carrier blank during the erection and closing operation. At the discharge end of the upper run of conveyer 176, there is provided a table or take-off conveyer means 200 for receiving the carrier package.

The guide rails 172 which initially engage the end panels 32 of the carrier blank B to move them to a position to receive the bottle necks are provided with extensions 202 and 204 which extend generally in the same direction as the guide rails 174. The extensions 202 and 204 are so arranged as to maintain engagement with the end panels 32 during the erection of the side panels 30, the extensions 202 and 204 progressively causing the end panels 32 to assume an overlapping relationship prior to their being secured together. As shown schematically in FIGURE 15, a static sword 206 is arranged to co-operate with the extension 202 so as to fold the outer portion of one end panel 32 to a position where a tab in that end panel can be positioned to be received in an aperture provided in the other end panel. The use of the static sword 206 depends upon the closure of the particular carrier blank, and a complete description of the same will follow under the description of the carrier blank per se. Of course, when the static sword 206 is used, a flat plate element 208 is arranged in the path of the other end panel 32 so as to hold the same in position during the initial locking of the end panels 32 together.

As best shown in FIGURES 2, 3, 5 and 6, a freely-rotatable wheel 210 is mounted for rotation on a horizontal axis transverse to the path of movement of the carrier. In more detail, the wheel 210 is carried on a suitable bracket 212 supported on the frame structure 10. The wheel 210 is provided with a plurality of radially-extending spokes or fingers 214 which are arranged to engage and push a tab in the uppermost overlapping end panel of the carrier through a suitable opening in the lowermost end panel. By making the wheel 210 freely-rotatable, and by providing a weighted starter spoke or finger 216 thereon, the wheel will be self-orienting so that the starter spoke 214 will be in a proper position to engage the leading edge of the erected carrier and rotate the wheel to bring the next succeeding spoke 214 to a proper position for pushing the tab out of the uppermost overlapping end panel through the lowermost overlapping end panel.

Referring now to FIGURES 1, 7 and 13, it will be noted that the positively-moving elements of the apparatus are actuated by an electric motor 218, suitably carried on frame structure 10. The electric motor 218, has a drive sprocket 220 which transmits rotary motion through an endless belt 222 to a reduction gear box 224. An output sprocket 226 on the reduction gear box 224 drives a belt 230 extending about a sprocket 232 keyed to a drive shaft 131 suitably supported in the frame structure 10. The drive shaft 64 is driven off the drive shaft 131 by means of a belt 234, passing about a sprocket 233, and a sprocket 236. The drive shaft 114 for the star wheels is driven off the drive shaft 131 by a belt 238 passing about sprockets 240 and 242 respectively keyed to the shafts 130 and 114. A pinion and belt train 244, driven off the shaft 131 is coupled to and drives the drive shaft 186 for the endles conveyer 176. The drive shaft 130 is driven off the drive shaft 131 by gears 133.

The electric motor 218 may be a three-phase, 60 cycle, 220-volt, A.C. motor obtaining its source of power from the power lines 246 through a master switch 248. The circuit includes the usual start switch 251, jog switch 253 and stop switch 255. Additionally, the circuit for the electric motor includes the previously mentioned carrier blank indexing switch 168, which indicates the absence or presence of a carrier blank on the timing conveyer means 62, as well as article indexing switches 250 and 252 actuated by the absence or presence of articles in the star wheels 110 and 112 respectively. The switches 168, 250 and 252 are in series and are closed when carrier blanks and articles are being properly fed, the switches being in a holding circuit energized when the start switch 251 is manually activated. On the other hand, if there is an interruption in the feed of articles in either row, or carrier blanks, one of the switches will open to break the holding circuit and the motor will stop until the condition is eliminated and the start switch 251 is re-activated. In between articles successively received in the pockets of the star wheels 110 and 112 it will be understood the switches 250 and 252 will be momentarily opened. In order to compensate for this and to sense the difference between no article at all and the momentary opening of the switches 250 and 252 between successive articles, an article index interlock switch 254 is provided in parallel with the article index switches 250 and 252. The purpose of the article interlock switch 254 is to maintain continuous current flow to the motor 218 when articles are being successively received in the star wheels 110 and 112. In more detail, the article index interlock switch 254 is generally located in the path of articles prior to their division into two rows by the divider member 24. The switch is so placed in the path of the articles that it is operated by articles to a closed position 180 degrees out of phase with the switches 250 and 252 and, thus, when the switches 250 and 252 momentarily open in between successively fed articles, the switch 254 is closed by articles in the infeed line and, thus, a by-pass maintains the holding circuit energized to keep the apparatus operating. On the other hand, if the infeed of articles is interrupted in the area of the switch 254 so that the switch 254 remains open at the time the switches 250 and 252 open momentarily in between articles, the holding circuit is broken and the motor 218 stops. The condition is then corrected and the apparatus is started by re-activating the start switch 251.

Referring now to FIGURES 28 and 29, slight modifications of the apparatus just previously described are schematically illustrated, the modifications being utilized for converting the apparatus to the packaging of cans rather than bottles. As shown in FIGURE 28, the cans C' are positioned in the pockets of star wheels 110 and 112 in substantially the same manner as the bottles and are spaced apart a distance less than two can diameters. The carrier blanks B', which are provided with special means described heretofore for retaining the cans in position during the erection of the blank, are fed in a similar manner to that previously described. It will be noted that the center portion or bottom panel 28' is supported on a dead plate element 256 with the side panels 30' and end panels 32' extending downwardly at a slight angle thereto. The diverger 170 is removed from the apparatus and static swords 170' are positioned inwardly of each row of cans and extend beneath the star wheels 110 and 112. The static swords 170' are arranged at an angle to the movement of the cans and carrier blanks and thus engage the base ends of the cans to cause them to move away from one another on their longitudinal axes until the chines of the cans engage tabs 38 in the end panels 32' of carrier blank B'. This condition occurs just as the cans and the carrier blank pass beneath the star wheels 110 and 112. Guide rails 172' for subsequently folding the end panels 32' into overlapping relationship initially engage the end panels 32' of carrier blank B' on their lower surface, whereas static swords 171 engage the other side of each of the panels 32' so as to bend the end panels 32' downwardly slightly out of the plane of the respective side panels 30'. This causes the tabs 38 to be in a position for engagement within the chine of the can when the same is moved outwardly by the static sword 170'. When cans C' have moved into engagement with outer tabs 38, the star wheels 110 and 112 press the base ends of the cans downwardly, causing the tabs 38 of the bottom panel to snap into engagement within the chines at the base ends of the cans. The cans are temporarily supported or secured onto the blank B'. Each guide rail 172' then moves the respective end panel 32' upwardly to a position where it is in planar relationship with its side panel 30' and then continues to fold the same so that, as the side panels 30' are erected with the cans secured thereto by the previously mentioned helical erection means or guide rails 174, the panels 32' are folded and eventually overlap one another and are locked together as previously described. The modifications shown in FIGURE 29 are substantially similar to those shown with respect to FIGURE 28 except that instead of the cans being initially placed on the carrier blank B' less than two diameters apart, they are placed on the carrier blank more than two diameters apart. In the modification shown in FIGURE 29, the static swords 170' are positioned outwardly of each row of cans and are arranged at an angle to intersect the path of movement of the cans so that they engage the outer ends of the cans and cause them to move toward one another on their longitudinal axes until the cans engage the tabs 38 in the bottom panel 28' of the carrier blank. When the cans have engaged the tabs 38 in the bottom panel 28' the star wheels press the outer ends of the cans past the tabs 38 of the end panels to cause the latter-mentioned tabs to snap past the chines and temporarily secure the cans to the carrier blank. It will be appreciated that the end panels 32' are moved slightly out of the plane of the side panels 30' by means of the static swords 171 and guide rails 172 so that the tabs 38 of the end panel are out of the plane of the side panels and, thus, the downward pressure on the cans C will cause the tabs to snap past the chines as described above.

Carrier or Carton

The paperboard carrier or carton of the present invention includes an improved and novel glueless closure means for securing the overlapping end panels of the carrier to each other.

Referring now to FIGURES 16 through 21 inclusive, the carrier or carton of the present invention there illustrated is adapted for packaging articles such as bottles. As heretofore described, the carrier is made from a substantially rectangular paperboard blank provided with the score lines 26 spaced apart proportionately to define the bottom panel 28, side panels 30, and overlapping end panels 32. The end panels 32 are provided with the circular cutouts or openings 34 through which the necks of the bottles extend, whereas the side panels 30 are provided with the cutouts 33 through which a portion of the base of the bottles extend.

The novel closure for the end panels 32 includes a first closure means generally indicated by the numeral 260 which is used to preliminarily interlock the overlapping end panels together to prevent their separation in the plane of overlap and a second closure means generally indicated by the numeral 262 which interlocks the end panels 32 together against movement apart in a direction transverse to the plane of overlap. The second closure means 262 also provides finger holes by which the package can be carried.

In more detail, the end panel 32 which is to be the outermost end panel of the package when the end panels are overlapped, is provided with a score line 264 spaced from, and extending parallel to its free edge 266. The portion of the end panel 232 outwardly of the score line will be defined as a flap 268 for the purpose of this description. Cut lines 270 are provided in the end panel 32 inwardly of the flap 268 and defined tabs 272 extending from the flap in a direction away from the free edge 266 and towards the score 26 between the particular end panel and its adjoining side panel 30. The tabs 272 interrupt the score line 264 at longitudinally-spaced points of the same.

The outermost end panel 32 of the overlapping end panels 32 is also provided with a second series of tabs 280 defined by cut lines 282 and score lines 284 extending transversely of, and intersecting the score line 264. The tabs 280 are each further provided with a pair of converging score lines 288 which start at the ends of the score lines 284 and extend toward the free edge of the tab.

Referring now to the end panel 32 which is to be the innermost end panel of the overlapping end panels 32, a plurality of cutouts 290 are provided to define openings for receiving the tabs 272. The cutouts 290 are suitably spaced apart and, with respect to the tabs 272, so that when the panels are overlapped and the tabs 272 are inserted through the cutouts 290, the base of the tabs engages the edge of the cutouts 290 nearest to the free edge of the panel. In addition to the cutouts 290, the innermost panel 32 is provided with a plurality of substantially semi-circular cutouts 292 which define tabs 294 articulated to the panel by score lines 296. It will be appreciated that the tabs 294 extend in the same direction as the tabs 280 and are spaced apart from each other a distance so that they may receive the respective tabs 280.

Referring back to FIGURE 14, it will be noted that the flap 268 is folded along the score line 264 as the particular end panel 32 is being folded with respect to its side panel 30 so that tabs 272 extend out of the plane of the panel 32 as the panel is being overlapped with respect to the other, or lowermost, panel 32. The tabs 272 are extended through openings provided by the cutouts 290, and then the flap 268 is folded back to its original planar position so that the tabs 272 hook about the edges of the openings and draw the end panels toward each other to provide proper tensioning of the enveloped carrier blank about the articles. When this has been accomplished the end panels 32 cannot be moved from the plane of overlap and, thus, are properly positioned for application of the second closure means 262.

The second closure means 262 is formed when the tabs 280 are pushed through the openings made by the pushing of the tabs 294 out of the cutouts 292. To provide the second closure with sufficient strength to prevent inadvertent opening of the package, or pulling apart of the the two panels 32 in a direction transverse to the plane of overlap, the tabs 280 are made larger than the tabs 294 and also have a generally rectangular configuration rather than a semi-circular configuration. By providing the converging score lines 288 on the tabs 280, the tabs may be easily pushed through the smaller openings made by the cutouts 292 when the panels are interlocked together.

Referring now to FIGURE 14, it will be noted that one of the spokes 214 of the wheel 210 is utilized to push the tab 280 downwardly through the opening defined by the cutout 292. The lower tab 294 is urged downwardly by the upper tab 280 and, as shown in FIGURE 21, when the tab 280 is in locked position, it overlaps the tab 284 and its side edges are under the opening defined by the cutout 292.

The closures defined by the closure means 260 and 262 may be opened without destroying the package by a positive pull upwardly on the flap 268. The score lines on the tabs 280 give the tabs sufficient flexibility to be disengaged by such positive action, but have sufficient rigidity to normally hold the end panels 32 together when the package is being transported. Since the closure is not destroyed, the customer can re-use the carrier by hand closing the same if so desired.

Referring now to FIGURES 22 and 24, the carrier blank B' disclosed therein is especially adapted for packaging cans. As described heretofore, the blank B' is provided with novel means for securing the cans to the side panels when the blank is open. The carrier blank B' is also provided with a similar first closure means 260 and second closure means 262 to that described with respect to carrier B. The first closure means 260 is identical with that previously described with respect to the carrier blank B, in that the outermost panel 32' is provided with a score line 264' parallel to its free edge 266', and a plurality of tabs 272' interrupt the same at spaced longitudinal points therealong. The other end panel 32' is

17 provided with the cutouts or openings 290', which in this case define separation tags 291 in the panels which are adapted to be pivoted downward along the score lines 293 when the tabs 272' are inserted therein. The tabs 291 extend down between the adjacent rows of cans and separate the upper ends of two side-by-side cans from each other. The bottom panel may be provided with tabs 295 which can be struck out of the same and extend upwardly between the base ends of side-by-side cans. The closure 262' includes tabs 288' in the outermost of the panels 32', the tabs 280' being positioned outwardly of the score line 264' and solely within the flap 268' rather than intersecting the same score line. The tabs 280, which are larger than the openings 292' provided in the other panel 32', are adapted to be received in the same in an identical manner to that described with the carrier blank B.

The carrier blank B' in FIGURE 23 is substantially identical to that disclosed in FIGURE 22, except that the separator tabs in the bottom panel 28' are omitted, as well as the tabs 291 in the innermost overlapping panel 32'. The cutouts 290' in this form of the invention merely are openings. The second closure means contains tabs 280' which are identically arranged to the tabs 280 of carrier B as well as openings 292' defined by tabs 294'.

Wherever "score lines" are referred to herein, it will be understood that these are positions whereat folding is to occur, whether or not the material is indented or grooved thereat.

It is thus seen that the objects and advantages of the present invention have been fully and effectively accomplished by the described method, apparatus, and carrier illustrated in the drawings. The method, apparatus, and carrier of the present invention are susceptible to some modifications without departing from the spirit and principles of the invention involved.

Therefore, the terminology used in the specification and the illustrations in the drawings, are for the purpose of description, and not limitation, the scope of the invention being defined in the claims.

It is to be understood that this invention is useful in connection with articles of various shapes in addition to conventional cans, bottles, etc., notably, lamp bulbs, golf balls, articles of china and plastic which have bottoms and side walls of various curved and other contours.

What is claimed is:

1. A method of packaging cans having chines on each end in a tubular carrier formed from a blank of paperboard having a plurality of fold lines spaced apart proportionately to define at least a bottom panel, opposite side panels and overlapping end panels, said carrier being adapted to be wrapped about a group of said cans arranged in two parallel rows and further having cutouts therein defining opposed tabs in the bottom panel and respective side panels when the blank is flat, the tabs interrupting the respective score lines, the method comprising the steps of: laying out the carrier blank with the bottom panel in a generally horizontal position and the respective side panels extending slightly downwardly from the bottom panel so that the tabs of the bottom panel project outwardly of the planes of the side panel, positioning two rows of cans in juxtaposition to the respective side panels and with the opposed can ends spaced apart a distance slightly greater than the maximum distance between opposite tabs on the bottom panel, moving the two rows of cans toward each other until the tabs of the bottom panels engage within the chines of the cans, then slightly folding the respective end panels downwardly relative the side panels until the tabs in the end panels snap into and engage within the chines of the cans, then folding the side panels upwardly together with the rows of cans until the cans are upright and the side panels are vertical, folding the end panels to a position of overlap, and then securing the overlapped end panels to each other.

2. The method of claim 1 wherein the step of securing the overlapped end panels to each other includes initially securing the end panels against movement outwardly of each other in the plane of overlap and then secondarily securing the end panels together to interlock the same against movement away from each other in a plane substantially transverse to the plane of overlap.

3. The method of claim 1 including pushing tabs from the bottom panel upwardly between adjacent cans in the rows of cans and wherein the step of securing the overlapped end panels to each other includes initially securing the end panels against movement outwardly of each other in the plane of overlap by hooking tops of the uppermost end panel through apertures in the lowermost end panel, the apertures being formed by tabs pushed downwardly between adjacent cans of the rows of cans and then secondarily securing the end panels together to interlock the same against movement away from each other in a plane substantially transverse to the plane of overlap.

4. In an apparatus for packaging similar shaped articles such as can or bottles into an open-ended paperboard carrier made from a flat blank having fold lines thereon spaced apart proportionately to define fold lines for at least a bottom panel, opposite side panels, and overlapping end panels, the combination comprising: means for transferring and orienting two rows of articles traveling generally upright to a position where the articles of both rows have their base ends opposing each other, indexing means for simultaneously receiving one article at a time from each row and depositing the same on a flat carrier blank, a source of supply of carrier blanks, means for feeding one carrier blank at a time from said source of supply, conveyor means, operating in sequence with said indexing means for receiving the carrier blank from said last-mentioned means and transferring the blank beneath said indexing means, means to advance the flat carrier blank with two rows of articles arranged thereon, said last-mentioned advancing means including means to erect the side panels of the carrier blank together with the articles thereon to a position where the side panels are parallel to each other and the two rows of articles are supported on their base ends on the bottom panel of the blank and means to fold said end panels into overlapping relationship, and means to secure said end panels together when in overlapping relationship.

5. The apparatus of claim 4 wherein said means of transferring and orienting the two rows of articles includes a pair of generally helical guide rail structures each arranged to receive one row of articles in a generally upright position, said pair of helical guide rail structures being further arranged to cause rotation of articles of one row in an opposite direction to rotation of articles in the other row as the rows of articles progress along the guide rail structures.

6. The apparatus of claim 4 wherein said indexing means includes a pair of pocketed star wheels mounted for rotation on a common axis, said star wheels being spaced apart whereby articles received in the respective star wheels have their base ends spaced apart a predetermined distance.

7. The apparatus of claim 6 wherein said star wheels have their pockets aligned whereby articles transferred thereby to the carrier blank have their longitudinal axes concident with each other.

8. The apparatus of claim 4 wherein said conveyor means operating in sequence with said indexing means includes a pair of endless belts spaced apart and having upper runs adapted to receive the carrier blank from said carried blank feeding means and pressure rollers cooperating with the upper run of said endless belts for holding the carrier blanks on the endless belts as they are transferred to said indexing means.

9. The apparatus of claim 4 wherein said conveyor means operating in sequence with said indexing means includes at least one endless belt having an upper run adapted to receive the carrier blank from said carrier blank feeding means, said belt having lug elements thereon spaced apart a distance equal to the width of the carrier blank and arranged to be received in an aperture in the carrier blank whereby the carrier blanks are transferred thereby in abutting edge relationship.

10. The apparatus of claim 4 in which said carrier blank feeding means includes at least one reciprocating stripper element for stripping a bottom carrier blank from a stack of carrier blanks, said stripper element being pivotal between predetermined limits on an axis parallel to the direction of its reciprocating motion.

11. The apparatus of claim 4 in which said carrier blank feeding means includes a pair of reciprocating stripper elements adapted to simultaneously engage an edge of a bottom carrier blank from a stack of carrier blanks, each stripper element being pivotable on an axis parallel to the direction of its reciprocating motion.

12. The apparatus of claim 4 in which said means to erect the side panels of the carrier blank together with the articles thereon include a helical guide rail structure comprising a pair of helical guide rails arranged to cooperate with each side panel to fold the same and to rotate the articles to an upright position, and wherein said means to fold said end panels into overlapping relationship include a pair of fold rails extending from a position adjacent said indexing means where said fold rails respectively engage the end panels to a position adjacent the means to secure the end panels together.

13. The apparatus of claim 4 wherein said means to secure said end panels together when in overlapping relationship includes a freely-rotatable wheel having spokes extending from the periphery thereof, said wheel being rotatable on an axis transverse of the direction of movement of the carrier with the articles therein and spaced above the carrier whereby one of the said spokes is engaged by the edge of the overlapping panels and is moved thereby to cause other of said spokes to push a locking tab in the uppermost of the overlapping panels through an aperture in the lowermost of said overlapping panels.

14. The apparatus of claim 13 wherein said wheel includes a weight whereby said wheel is self-orientated so that a particular spoke engages the edges of the overlapping panels of each carrier.

15. In an apparatus for packaging similar shaped articles such as cans or bottles into an open-ended paperboard carrier made from a flat blank having fold lines thereon spaced apart proportionately to define fold lines for at least a bottom panel, opposite side panels and overlapping end panels, the carrier blank further having cutouts therein for receiving and retaining the articles as the blank is erected, the combination comprising: an article receiving station, means for feeding a carrier blank in a substantially flat position to the article receiving station, means for feeding two rows of articles to the article receiving station and positioning the articles on the carrier blank with the articles of one row having their longitudinal axes coincident with the respective articles of the other row and their base ends spaced from the base ends of articles of the other row, conveyer means for moving the carrier blank and the rows of articles positioned thereon from the article receiving station, means for moving the articles in a direction of their longitudinal axes into engagement with the cutouts in the carrier blank as the carrier blank and articles move from the article receiving station, means for erecting the side panels and the articles positioned thereon as the carrier blank and articles are moving on said conveyer means, and means to fold the end panels into overlapping relationship and secure the same to each other.

16. The apparatus of claim 15 in which said means for moving the articles in the direction of their longitudinal axes into engagement with cutouts in the carrier blank include a diverger shoe positioned adjacent said article receiving station and arranged to engage the articles on their base ends and urge each row of articles outwardly as the carrier blanks and rows of articles move from the article receiving station.

17. The apparatus of claim 16 including static fold rails for folding the end panels to a position where the apertures therein are aligned with the bottle necks.

18. The apparatus of claim 15 in which said means for moving the articles in the direction of their longitudinal axes into engagement with cutouts in the carrier blank include a pair of spaced static blades for engaging the ends of the rows of articles opposite their base ends whereby the respective articles of the rows of articles are moved toward each other.

19. The apparatus of claim 15 wherein the cutouts in the carrier blank for receiving the articles are provided in the side panels of the same spaced along and interrupting the fold lines to provide tabs and wherein the articles are cans having chines at each end arranged to receive tabs, said means for moving the articles in the direction of their longitudinal axes including a pair of spaced static blades for engaging the outer ends of the cans of each of the rows and moving the same toward each other until certain of the tabs in the blank engage the chines, and means for snapping other tabs of the carrier blank into chines at opposite ends of the cans.

20. The apparatus of claim 19 wherein said last-mentioned means includes first static fold rails for partially folding the end panels in a reverse direction and second static fold rails cooperating with the opposite side of the end panels to flex the end panels and cause the tabs to snap into the chines.

21. A device for securing overlapping end panels of an open-ended paperboard carrier packaging similar shaped articles by pushing locking tabs in the outermost end panel through cutouts in the innermost panel, the erected carrier moving in a path transverse to the open ends of the same, said device comprising a freely-rotatable member mounted for rotation on an axis above the carrier and transverse to the path of movement of the carrier, said member having a plurality of spokes extending from its periphery, and means to self-orient said member, said means engaging the edges of the overlapping panels and being moved by the movement of the carrier so that the spokes engage the locking tabs in the uppermost end panel and push the same through cutouts in the lowermost panel.

22. The device of claim 21 wherein said means includes a weighted spoke carried by said member.

23. The device of claim 21 wherein said spokes extend radially of the axis of rotation of said member.

24. In an apparatus for packaging similar shaped articles such as cans or bottles into an open-ended paperboard carrier made from a flat blank having score lines thereon spaced apart proportionately to define fold lines for at least a bottom panel, opposite side panels, and overlapping end panels, the combination comprising means for moving two rows of articles standing upright down an incline and simultaneously rotating the rows of articles in opposite directions until the articles are horizontal and articles of one row have base ends opposing articles of the other row, means for feeding open substantially flat carrier blanks beneath said last-mentioned means so that said last-mentioned means successively positions articles from each row upon the carrier blanks in a horizontal position, means for transferring the carrier blanks and the articles received thereon up an incline, and means for erecting the carrier blank to at least partially envelope the articles, said last-mentioned means also rotating the rows of articles traveling with the carrier blank to an upright position within the erected carrier.

25. A method of packaging articles each having a base end in a tubular carrier, said carrier being formed from a flat blank of flexible material having a bottom panel, opposite side panels, and overlapping end panels, said carrier being adapted to be wrapped about a group of said articles arranged in two parallel rows, the method comprising the steps of: (1) continuously feeding successive carrier blanks to a first station in substantially flat condition, (2) continuously feeding the articles to be packaged to said first station in successive relation above said successively fed carrier blanks, (3) successively moving said articles onto said carrier blanks at said first station in a pair of rows of articles, each row of articles resting substantially on opposite ones of said side panels respectively, (4) moving said carrier blanks from said first station, bending said end panels relative to their respective side panels, and securing both ends of the articles to the carrier by relative movement between said articles and said side panels, (5) moving the side panels of the carrier blank, while traveling with the rows of articles positioned thereon to a position where the side panels are substantially parallel to each other, and (6) folding and securing the end panels to one another so as to form the tubular carrier.

26. A method as in claim 25 wherein the articles are positioned on said carrier blanks at said first station in substantially parallel rows with the base ends of the articles of one row substantially opposing and spaced from the base ends of the articles of the other row.

27. A method as in claim 25 wherein the end panels of the blanks are consecutively folded upwardly relative to their respective side panels and opposed articles are consecutively moved into retaining engagement therewith.

References Cited in the file of this patent
UNITED STATES PATENTS

| | | |
|---|---|---|
| 2,167,770 | Mullenix | Aug. 1, 1939 |
| 2,270,820 | Kaliska | Jan. 20, 1942 |
| 2,312,651 | Koolnis | Mar. 2, 1943 |
| 2,765,073 | Murray | Oct. 2, 1956 |
| 2,798,603 | Grinspoon | July 9, 1957 |
| 2,809,484 | Gentry | Oct. 15, 1957 |
| 2,986,857 | Gantz | June 6, 1961 |
| 3,032,945 | Currie | May 8, 1962 |
| 3,045,401 | Ganz | July 24, 1962 |